United States Patent
Shimizu et al.

(10) Patent No.: US 9,658,369 B2
(45) Date of Patent: May 23, 2017

(54) GEOMETRIC TRANSFORMATION LENS

(75) Inventors: Sota Shimizu, Tsu (JP); Susumu Sato, Akita (JP)

(73) Assignee: Sota Shimizu, Tsu-shi, Mie (JP)

(*) Notice: Subject to any disclaimer, the term of this patent is extended or adjusted under 35 U.S.C. 154(b) by 94 days.

(21) Appl. No.: 14/116,684

(22) PCT Filed: May 11, 2012

(86) PCT No.: PCT/JP2012/062134
§ 371 (c)(1),
(2), (4) Date: Mar. 17, 2014

(87) PCT Pub. No.: WO2012/153837
PCT Pub. Date: Nov. 15, 2012

(65) Prior Publication Data
US 2014/0198289 A1    Jul. 17, 2014

(30) Foreign Application Priority Data
May 12, 2011    (JP) .................... 2011-107107

(51) Int. Cl.
*G02F 1/13*    (2006.01)
*G02B 3/00*    (2006.01)
(Continued)

(52) U.S. Cl.
CPC ............ *G02B 3/0081* (2013.01); *G02B 3/14* (2013.01); *G02B 27/2214* (2013.01); *G02F 1/0045* (2013.01); *G02F 2001/294* (2013.01)

(58) Field of Classification Search
CPC ........ G02B 3/0081; G02B 15/00; G02B 3/14; G02B 27/2214; G02F 2203/28; G02F 1/0045; G02F 2001/294
(Continued)

(56) References Cited

U.S. PATENT DOCUMENTS

| 2008/0088756 A1* | 4/2008 | Tseng ..................... G02B 1/06 349/33 |
| 2011/0096250 A1* | 4/2011 | Cha et al. ........................ 349/15 |
| 2011/0292306 A1* | 12/2011 | Kim .................. G02B 27/2214 349/5 |

FOREIGN PATENT DOCUMENTS

| JP | 3140079 U | 3/2008 |
| JP | 2008203626 A | 9/2008 |
| JP | 2010530086 A | 9/2010 |

OTHER PUBLICATIONS

International Search Report, issued in PCT/JP2012/062134, dated Jul. 17, 2012.

* cited by examiner

*Primary Examiner* — Nathanael R Briggs
(74) *Attorney, Agent, or Firm* — Locke Lord LLP; Howard M. Gitten

(57) ABSTRACT

Provided is a geometric transformation lens which can transform a target image geometrically as desired, achieving downsizing and reducing energy consumption. Even if another target to be observed more in detail is inside the field of view, the geometric transformation lenses (20a, 20b, 20c and 20d) can magnify optically the desired region within the target projection image by supplying the magnification instruction voltage ($V_{2,mn}$) to the corresponding magnifying/demagnifying electrodes ($EL_{2,mn}$) simply without moving the lens itself using heavy mechanical parts motorized. This can achieve downsizing because a space for setting the existing mechanical part to control the direction of the lens and its motion can be disregarded. This also can achieve reducing energy consumption because no space is needed to move the lenses with the heavy mechanical parts.

6 Claims, 11 Drawing Sheets

(51) Int. Cl.
    *G02B 3/14*          (2006.01)
    *G02B 27/22*       (2006.01)
    *G02F 1/29*         (2006.01)
    *G02F 1/00*         (2006.01)

(58) Field of Classification Search
    USPC .......................................................... 349/200
    See application file for complete search history.

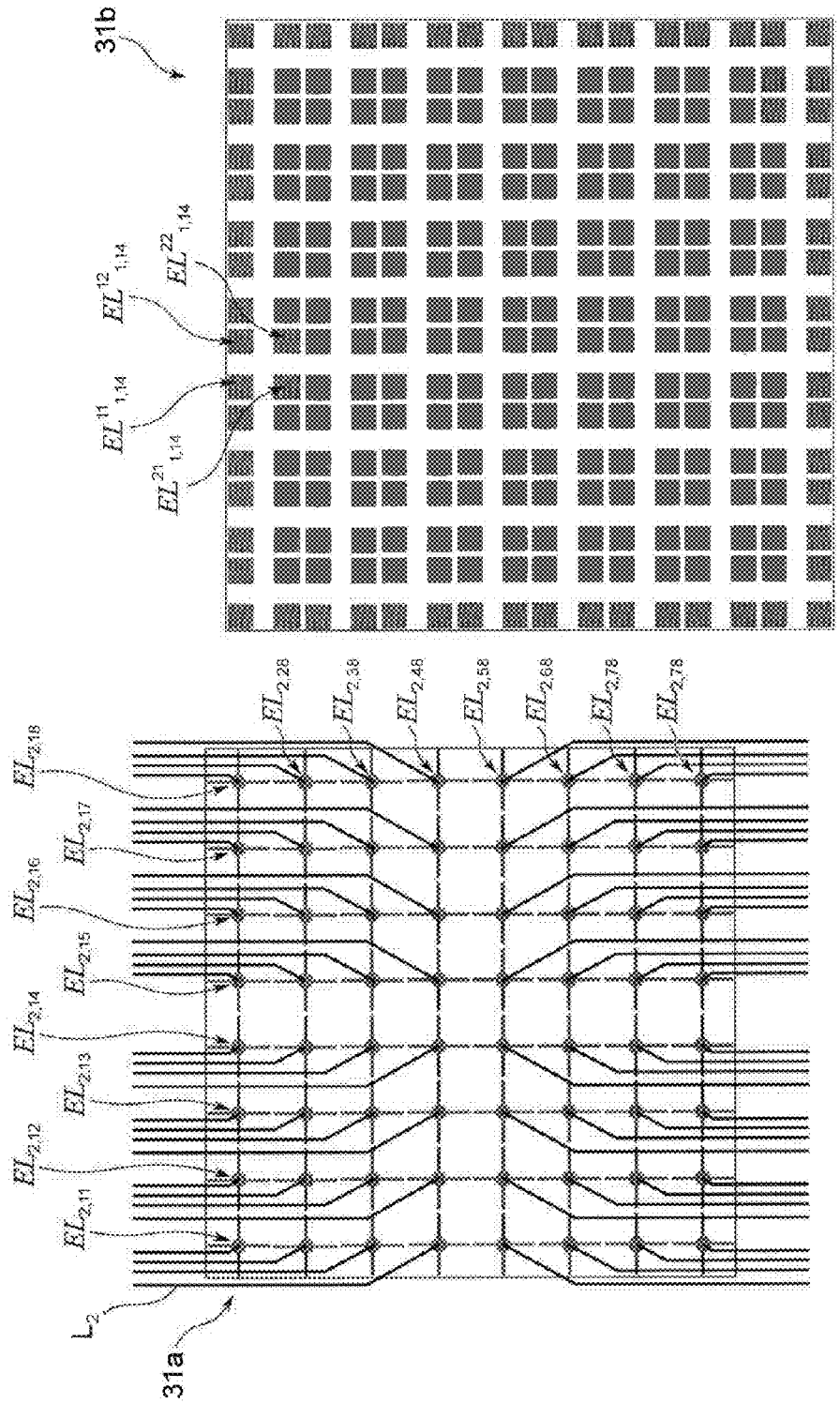

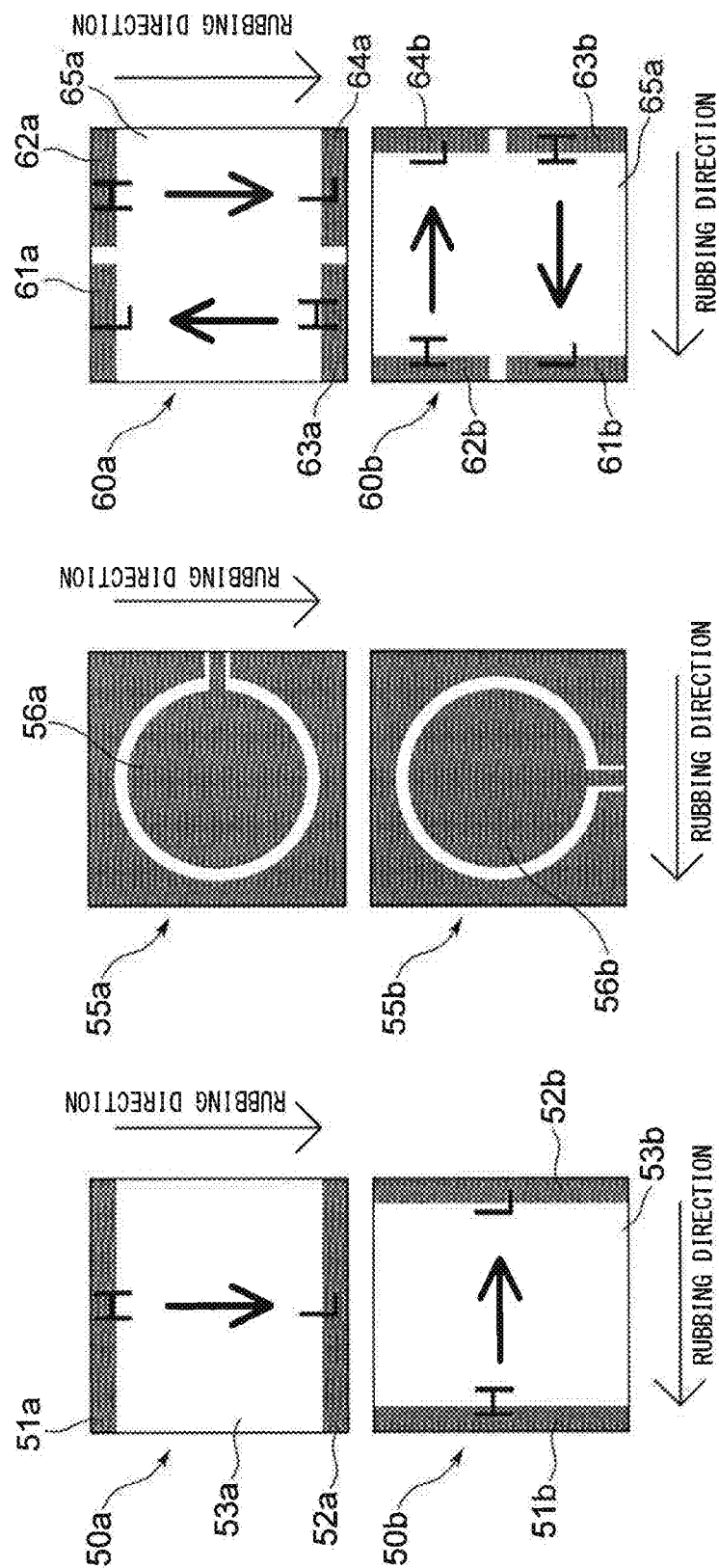

Fig. 11
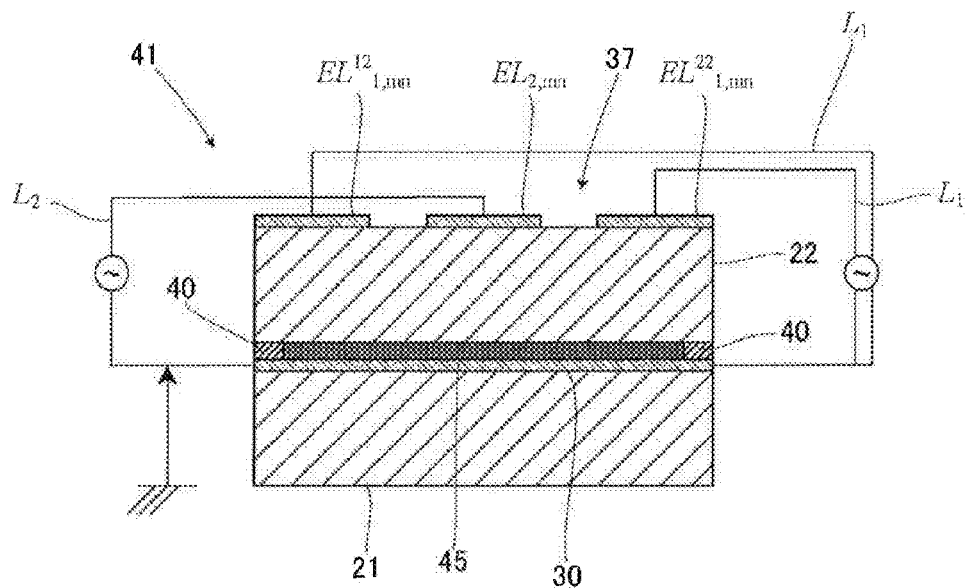
Fig. 12A
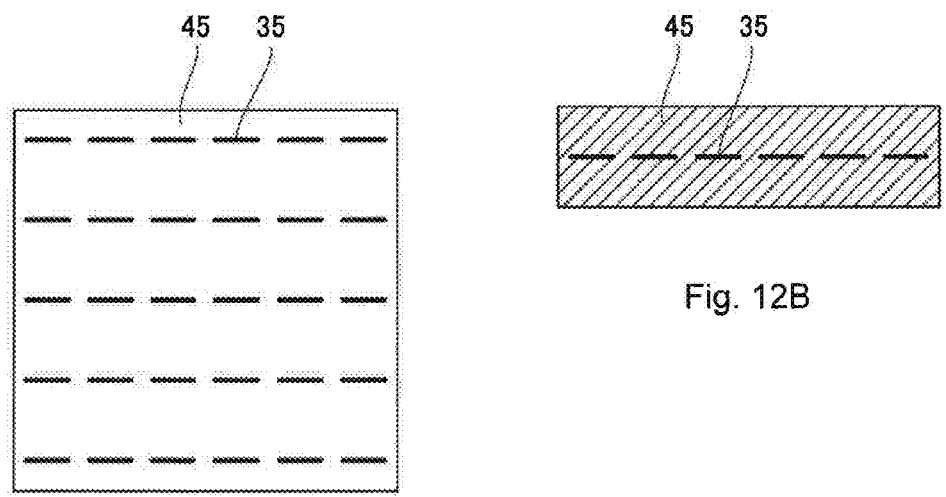
Fig. 12B

GEOMETRIC TRANSFORMATION LENS

CROSS REFERENCE TO RELATED APPLICATIONS

This application is a U.S. National Stage application under 35 U.S.C. §371 of International Patent Application Serial No. PCT/JP2012/062134, filed May 11, 2012, which Application claims the benefit of priority of Japanese Patent Application No. JP2011-107107, filed May 12, 2011, the disclosures of each of which are expressly incorporated by reference in their entireties.

TECHNICAL FIELD

The present invention relates to a geometric transformation lens which is suitably applicable to imaging devices such as digital cameras and video cameras.

BACKGROUND ART

It is well-known that a human eye has horizontally 120-degree wide field of view, its visual acuity is the highest near a center on a retina, so-called fovea, and decreases rapidly towards periphery of the fovea. This means that the human eye has a quite superior function that can observe an environment in detail by quite small amount of information by changing a direction of gaze in combination with eye movement.

Recently, inspired from the abovementioned human eye function, a special wide-angle lens having a distribution of magnification similar to that of the human visual acuity (wide-angle fovea lens hereafter) has been invented (see Patent Literature 1, for example). This special lens is applicable to a commercially-available imaging device such as CMOS/CCD cameras. Using the wide-angle fovea lens, a user can observe the wide field of view without increasing the amount of visual information and, simultaneously, can observe a target in detail in the central region, i.e., an attention region having high resolution in the field of view. Thus, the wide-angle fovea lens is an optical lens system which is quite effective in the field of information and communication technology.

CITATION LIST

Patent Literature

Patent Literature 1: JP2010-530086A

SUMMARY OF INVENTION

Technical Problem

However, when the imaging device having the abovementioned structure including the wide-angle fovea lens is fixed and a target (object) to be observed more in detail is out of the attention region of the central field of view, an optical axis of the lens (the visual line, hereafter) of the device needs to move using a mechanical part such as a motor in order to capture the target inside the attention region since high resolution is achieved only in this region. Hence, using the wide-angle fovea lens includes the following problems: (1) It is hard to downsize the whole system, because a storage space for installing the mechanical part to move the wide-angle fovea lens and an operation space for moving the wide-angle fovea lens per se. (2) It is hard to reduce energy consumption due to performance of such the mechanical part.

The present invention has been made taking into account the abovementioned issues, and it is an objective of the present invention to provide a geometric transformation lens which can transform a projection image of the target into a desired form geometrically, achieving reducing energy consumption and downsizing.

Solution to Problem

In order to solve the abovementioned problems, according to a first aspect of the present invention, a geometric transformation lens has a refraction index change layer including a refraction index changing means, which is provided between a first substrate and a second substrate, and controls orientation of the refraction index changing means by an external stimulus given to the refraction index change layer to transform a target projection image geometrically based on a change of the orientation of the refraction index changing means.

According to a second aspect of the present invention, the refraction index change layer is a liquid crystal lens layer, the refraction index changing means is molecules in a liquid crystal of the liquid crystal lens layer, the first substrate has a first electrode and the second substrate has a second electrode, wherein a voltage as an external stimulus is applied to between the first electrode and the second electrode to control orientation of the molecules in the liquid crystal and the target projection image is transformed geometrically based on refraction of luminous flux from the target via the molecules in the liquid crystal.

According to a third aspect of the present invention, the first electrode has a single or a plurality of magnifying/demagnifying electrodes provided in a regularly-arranged manner, wherein the voltage is applied selectively to either the single magnifying/demagnifying electrode or the plurality of magnifying/demagnifying electrodes to control the orientation of molecules in the liquid crystal facing the selected single or plurality of magnifying/demagnifying electrodes and the target projection image is magnified and/or demagnified based on refraction of luminous flux from the target via the molecules in the liquid crystal.

According to a fourth aspect of the present invention, the first electrode further has a plurality of rotating electrodes regularly-arranged, wherein the voltage is applied to the plurality of rotating electrodes to control an orientation of molecules in the liquid crystal facing the plurality of rotating electrodes and the target projection image is rotated based on refraction of luminous flux from the target via the molecules in the liquid crystal.

In addition, according to a fifth aspect of the present invention, a bias voltage is applied from the second electrode to the first electrode to control the orientation of the molecules in the liquid crystal between the first electrode and the second electrode, and the target projection image is translated parallel based on refraction of luminous flux from the target via the molecules in the liquid crystal.

According to a sixth aspect of the present invention, a bias voltage is applied from the second electrode to the first electrode to control the orientation of the molecules in the liquid crystal between the first electrode and the second electrode, and a single region or multiple regions in the target project image is magnified and/or demagnified while maintaining a wide-angle field of view of the geometric transformation lens.

Advantageous Effects of Invention

With the present invention, it is possible to provide a geometric transformation lens that can transform the target image into a desired form geometrically and to achieve downsizing and reducing energy consumption.

BRIEF DESCRIPTION OF DRAWINGS

FIG. 9A shows a schematic view of a resolved structure of an ITO electrode layer according to another embodiment;

FIG. 9B shows a schematic view of a resolved structure of an ITO electrode layer according to another embodiment;

FIG. 10A shows a schematic view of a resolved structure of an ITO electrode layer according to another embodiment;

FIG. 10B shows a schematic view of a resolved structure of an ITO electrode layer according to another embodiment;

FIG. 10C shows a schematic view of a resolved structure of an ITO electrode layer according to another embodiment;

FIG. 11 shows a schematic view of a sectional side view composition of a micro liquid lens cell according to another embodiment;

FIG. 12A shows a top view of an initial orientation state of molecules in a liquid crystal of a micro liquid crystal lens cell;

FIG. 12B shows a sectional side view of an initial orientation state of molecules in a liquid crystal of a micro liquid crystal lens cell;

REFERENCE SIGNS LIST

Figure 1:
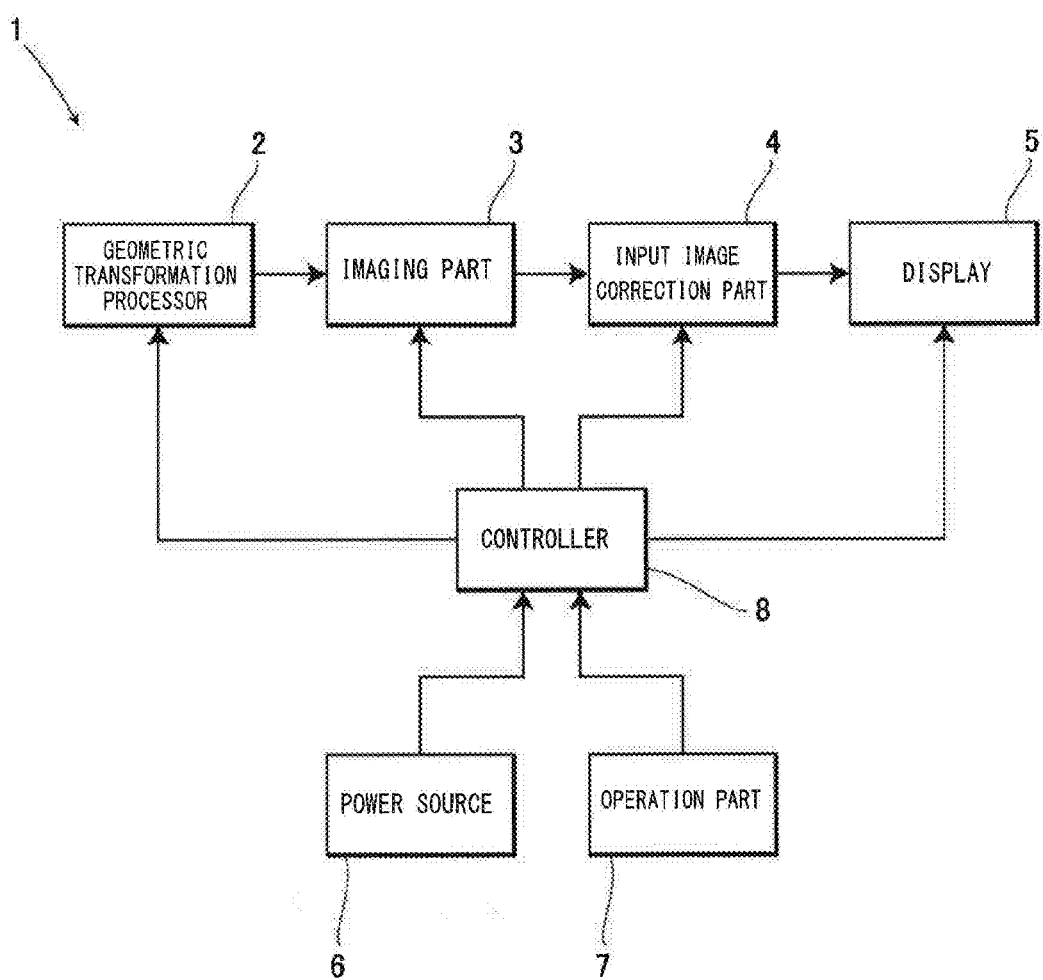
FIG. 1 shows a block diagram of the whole composition of an imaging device.

1: an imaging device
2: a geometric transformation processor
15: a geometric transformation lens
20a, 20b, 20c, 20d: a liquid crystal lens for a geometric transformation lens
21: a first substrate
22: a second substrate
23: a liquid crystal lens layer (refraction index change layer)
35: molecules in a liquid crystal (a means to change refraction index)
30: a standard electrode (a second electrode)
31: ITO electrode layer (a first electrode)
$EL_{2,mn}$: an electrode for magnifying/demagnifying (an electrode for magnifying, an electrode for demagnifying)
$EL_{1,mn}$: an electrode for rotating

DESCRIPTION OF EMBODIMENTS

One of implementations of this disclosure is described based on the figures as follows.

(1) Outline of the Imaging Device

In FIG. 1, reference numeral 1 denotes an imaging device. The imaging device 1 has a composition that a geometric transformation processor 2, an imaging part 3, an input image correction part 4, a display 5, a power source 6, and an operation part 7 are connected with a control part 8. Electric power supplied from the power source 6 makes each circuit part operable. The control part 8 has a composition of microcomputer, mainly CPU (Central Processing Unit), RAM (Random Access Memory) and ROM (Read Only Memory). The control part 8 achieves each function by reading a stored programs from ROM and executing it with CPU.

The operation part 7 has buttons such as a magnifying command button, a demagnifying command button and a rotating command button, and a mouse device by which its coordinate pointing (cursor) function can decide given regions in the projection image displayed on the display 5 as the magnifying region, and the demagnifying region, and others. The control part 8 achieves each processing in response to the user's input operation by each type of the buttons, the mouse and the like.

For example, the control part 8 receives a magnifying instruction, a demagnifying instruction and a rotating instruction, all of which are given by the user's input operations to the operation part 7. In accordance with the instruction, the control part 8 generates and sends a magnifying instruction signal, a demagnifying instruction signal, and a rotating instruction signal to the geometric transformation processor 2. The geometric transformation processor 2 has a geometric transformation lens (described later) that is input luminous flux from the target, outputs a geometrically-transformed emission rays, and can focus them on a solid-state imaging chip (no figure) of the imaging part 3.

When the geometric transformation processor 2 receives the magnifying instruction signal, the demagnifying instruction signal and the rotating instruction signal from the control part 8, the molecules in the liquid crystal of a liquid crystal lens layer (described later) provided in the geometric transformation lens change their orientation state according to the magnifying instruction signal, the demagnifying instruction signal and the rotating instruction signal to change the refraction index of the liquid crystal lens layer. Thus, the geometric transformation processor 2 refracts the luminous flux from the target by the molecules in the liquid crystal, magnifies and demagnifies a single region or multiple regions, rotates the whole luminous flux, to focus the magnified, demagnified and rotated target projection image on the solid-state imaging chip of the imaging part 3.

The imaging part 3 exposes (storages electric charge by photoelectric conversion) the projection target image focused on the solid-state imaging chip, generates an image signal of the target projection image, and sends this signal to the input image correction part 4. The input image correction part 4, for example, receives the image signal, where a single region is magnified in the geometric transformation processor 2, from the imaging part 3, compensates the signal by demagnifying the region of the target projection image magnified with the geometric transformation processor 2 into the original magnification, stores this signal in a computer memory unillustrated, and sends the signal to the display 5. In the display 5, the image having uniform magnification is displayed. The image includes the regions having higher resolution due to the previous magnification by the geometric transformation processor 2 optically, i.e., having higher resolution even after demagnifying to the original magnification, and thereby enabling the target projection image to be displayed more in detail for the users.

Figures 2A, 2B:
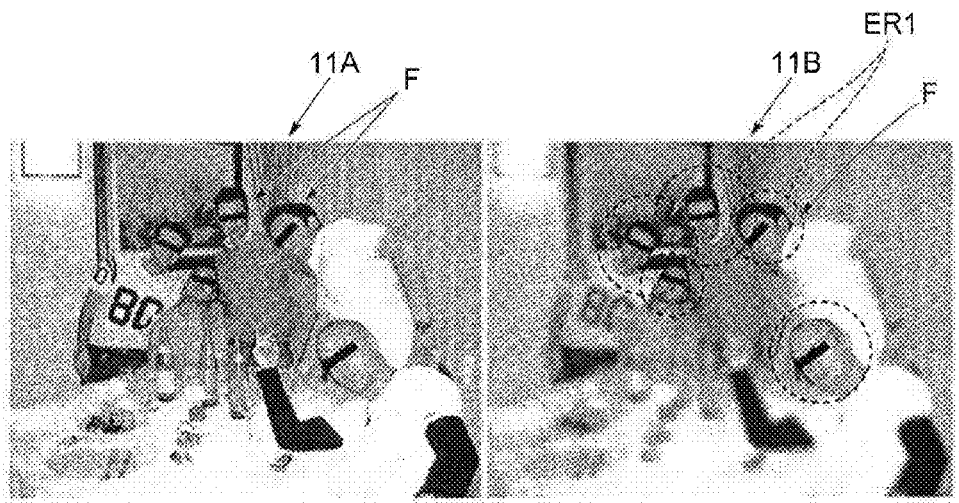
FIG. 2A shows a pictures of an input image before a magnifying process.
FIG. 2B shows a picture of an image after increasing the resolution by the partial magnifying process.

Concretely, in the imaging device 1, the display 5 displays a projection image 11A without magnifying, demagnifying and rotating as shown in FIG. 2A, when no magnifying instruction, no demagnifying instruction, and no rotating instruction are instructed via the operation part 7. In the imaging device 1, when only face area F in the projection image 11A is needed to be high resolution, the face area F is pointed to, for example, by a cursor, and a magnifying instruction is given based on an input operation of the operation part 7. Thus, in the imaging device 1, the geometric transformation processor 2 magnifies the face area F optically by refracting the luminous flux of the region corresponding to the face area F, and the imaging part 3 obtains an image signal using the luminous flux to send the image signal to the input image correction part 4.

In the imaging device 1, the input image correction part 4 generates an image signal having the original magnification reverted by demagnifying the face area F, magnified at the geometric transformation processor 2, with the same magnification ratio as magnified and send this corrected image signal to the display 5. Thus, in the display part 5, a projection image 11B, where the whole magnification is uniform except for the face area F, i.e., a magnified region ER1 corresponding to the face area F has higher resolution, and regions other than the face area F has lower resolution as shown in FIG. 2B, can be displayed. According to FIG. 2B, the regions other than the magnified region ER1 corresponding to the face area F have an orientation state of the molecules in the liquid crystal of the liquid crystal lens layer as magnifying inside the magnified region ER1. Hence, the resolution of the regions except the face area F is reduced by the refracted luminous flux from the target.

On the other hand, in the imaging device 1, when the input image correction part 4 receives the image signal, which includes a region demagnified partly by the geometric transformation processor 2, from the imaging part 3, the input image correction part 4 compensates the magnification of the demagnified region into the original magnification. Specifically, the input image correction part 4 compensates the image signal received from the imaging part 3 to magnify and revert back the region demagnified by the geometric transformation processor 2, into the original magnification, and sends this signal to the display 5, storing the signal into the computer memory. In the display 5, the projection image having uniform magnification is displayed. In this uniform magnification image, the region optically demagnified by the geometric transformation processor 2 has lower resolution. This means the total amount of the image data becomes reduced.

Figures 3A, 3B:
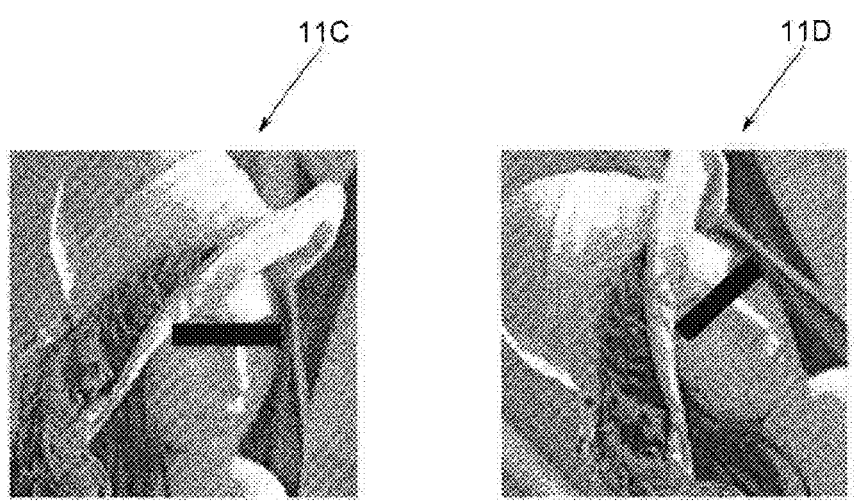
FIG. 3A shows a picture of an input image before a rotating process.
FIG. 3B shows a picture of an image after the rotating process.

Further, as shown in FIG. 3A, when a projection image 11C is rotated optically in the geometric transformation processor 2, the imaging device 1 makes the display 5 display the projection image 11D of which the whole is rotated by a given angle as shown in FIG. 3B. In the imaging device 1, the whole luminous flux from the target is refracted and rotated by the molecules in the liquid crystal of the geometric transformation processor 2, the target projection image of this rotated flux is focused on the solid-state imaging chip of the imaging part 3. The imaging part 3 exposures the target projection image focused on the solid-state imaging chip (i.e. conducts electric charge storage by photoelectric conversion), generates an image signal of the target projection image, send it to the input image correction part 4. The image signal is sent to the display 5 as it is without processing such as compensation at the input image correction part 4. Thus, the display part 5 displays the projection image 11D that is the whole target image rotated by the given angle as shown in FIG. 3B.

(2) Composition of the Geometric Transformation Processor

Figure 4:
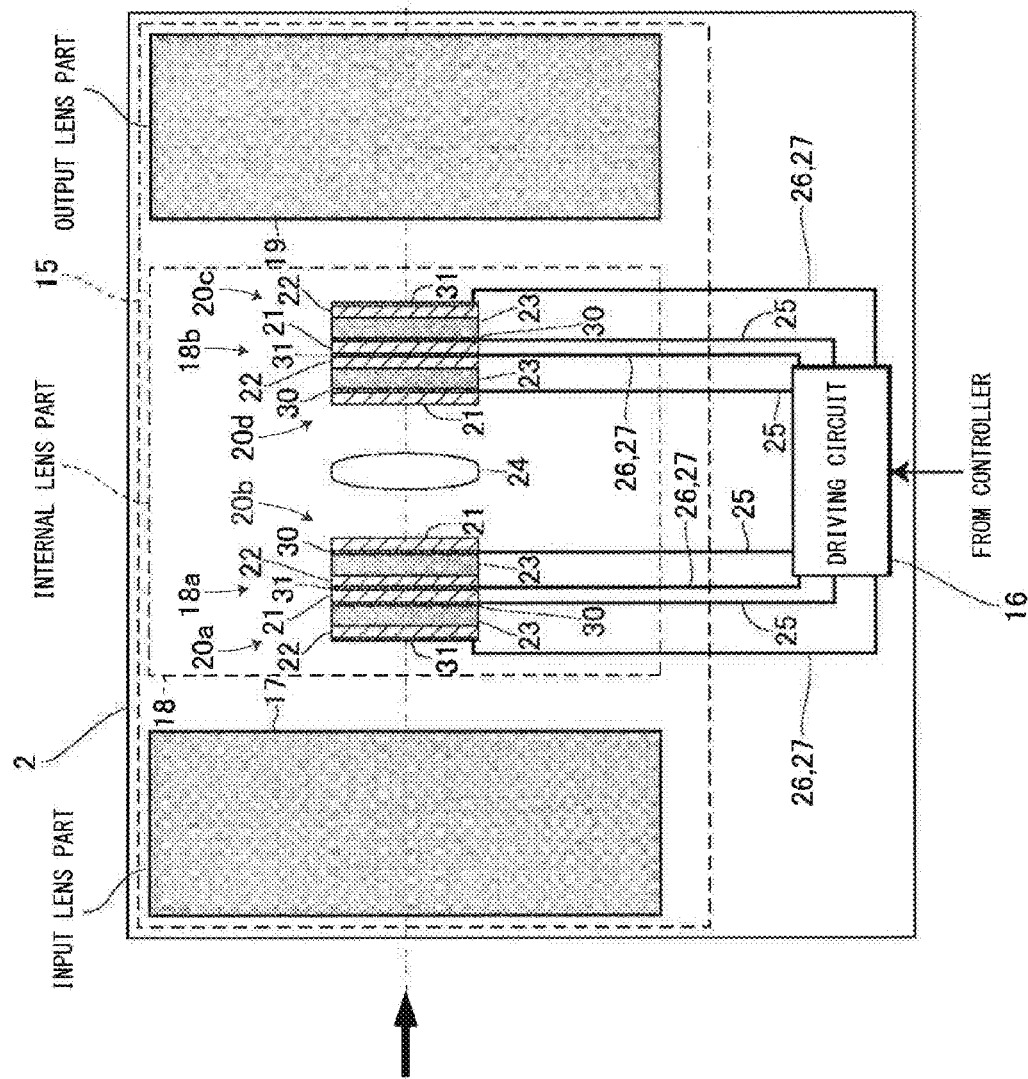
FIG. 4 shows a schematic view of a geometric transformation processor.

Hereinafter, the geometric transformation processor 2 that carries out the magnifying process, the demagnifying process, and the rotating process optically will be concretely described. As shown in FIG. 4, the geometric transformation processor 2 has an optical system, i.e., a geometric transformation lens 15, and a driving circuit 16 that is connected to the control part 8. The geometric transformation lens 15 comprises an input lens part 17, an inside lens part 18 and an output lens part 19. The luminous flux from the target passes through the input lens part 17, the inside lens part 18, and the output lens part 19 in this order and is finally focused on the solid-state imaging chip of the imaging part 3.

The input lens part 17, including a super wide-angle lens having a wide field of view and a diaphragm, serves to collect and arrange the luminous flux from the target while maintaining the wide-angle field of view. The inside lens part 18 to which the luminous flux passing through the input lens part 17 is entered, for example, has an input-side lens set 18a composed of two liquid crystal lenses 20a and 20b for the geometric transformation lens, an output-side lens set 18b composed of two liquid crystal lenses for the geometric transformation lens 20c and 20d, and a luminous flux collection lens 24 placed between the input-side lens set 18a and the output-side lens set 18b, where the driving circuit 16 is connected to liquid crystal lenses for the geometric transformation lens, 20a, 20b, 20c, and 20d, respectively.

The driving circuit 16 changes the orientation state of the molecules in the liquid crystal sealed in the liquid crystal lens layer 23 between the first substrate 21 and the second substrate 22 by supplying the magnifying applying a magnification instruction voltage, a demagnification instruction voltage, and a rotation instruction voltage to the liquid crystal lenses for the geometric transformation lens 20a, 20b, 20c, and 20d and changes the refraction index in the liquid crystal lenses for the geometric transformation lens 20a, 20b, 20c, and 20d, based on the molecules in the liquid crystal.

In the driving circuit 16, a standard voltage wire 25 is connected to a standard electrodes 30 of the liquid crystal lenses for the geometric transformation lens 20a, 20b, 20c, and 20d respectively, and a first set of wires 26 and a second set of wires 27 are, respectively, connected to an ITO (Indium Tin Oxide) electrode layer 31 of the liquid crystal lenses for the geometric transformation lens 20a, 20b, 20c, and 20d. In the liquid crystal lenses for the geometric transformation lens 20a, 20b, 20c, and 20d, all molecules in the liquid crystal of the liquid crystal lens layer 23 are oriented as being parallel to a surface of the liquid crystal lens and being unidirectional in a unique oriented direction, by supplying a voltage compensating pre-tilt angle of the oriented molecules in the liquid crystal from the driving circuit 16 to between the standard electrode 30 and the ITO electrode layer 31 via the standard voltage wire 25, the first set of wires 26, and the second set of wires 27.

In case of the embodiment, in the inside lens part 18, the liquid crystal lenses for the geometric transformation lens 20a, 20b, 20c, and 20d provided in the input-side lens set 18a and the output-side lens set 18b respectively have the same structure. In the input-side lens set 18a, the two liquid crystal lenses for the geometric transformation lens 20a and 20b form a two-layer structure. In the output-side lens set 18b, in the same manner, the two liquid crystal lenses 20c and 20d form a two-layer structure.

In the input-side lens set 18a, the molecules in the liquid crystal of the liquid crystal lens layers 23 of the two liquid crystal lenses for the geometric transformation lens 20a and 20b, respectively, are anisotropic to their unique oriented directions. Such anisotropy of the molecules in the liquid crystals is reduced by making these two liquid crystal lenses for the geometric transformation lens 20a and 20b be of multi-layer structure. Concretely, like this embodiment, in case when the input-side lens set 18a has two-layer structure of the liquid crystal lenses for the geometric transformation lens 20a and 20b, the anisotropy of the molecules in the liquid crystals is reduced by orthogonalizing the unique oriented direction of the molecules in the liquid crystal of the liquid crystal lens for the geometric transformation lens 20a in the first layer and that of the liquid crystal lens for the geometric transformation lens 20b in the second layer.

In the output-side lens set 18b, similarly to the input-side lens set 18a, since the molecules in the liquid crystal of the liquid crystal lens layers 23 of the two liquid crystal lenses for the geometric transformation lens 20c and 20d, respectively, are anisotropic to their unique oriented directions, such the anisotropy of the molecules in the liquid crystal is reduced by orthogonalizing the unique oriented direction of the molecules in the liquid crystal of the liquid crystal lens for the geometric transformation lens 20c in the first layer and that of the liquid crystal lens for the geometric transformation lens 20d in the second layer.

In this embodiment, it is explained that the input-side lens set 18a having the two-layer structure by the two liquid crystal lens for the geometric transformation lens 20a and 20b and the output-side lens set 18b having the two-layer structure by the two liquid crystal lens for the geometric transformation lens 20c and 20d are applied, however, the present invention is not limited only this case. The input-side lens set and the output-side lens set having three-, four- or more multi-layer structure of the liquid crystal lens for the geometric transformation lens are applicable, in order to reduce anisotropy of the molecules in the liquid crystal.

The driving circuit 16, for example, applies the magnification instruction voltage and the demagnification instruction voltage to the respective ITO electrodes 31 of the liquid crystal lenses for the geometric transformation lens 20a, 20b, 20c, and 20d, via the first wire set 26 based on a magnifying instruction command and a demagnifying instruction command from the control part 8. In addition, the driving circuit 16 applies the rotation instruction voltage to the respective ITO electrodes 31 of the liquid crystal lenses for the geometric transformation lens 20a, 20b, 20c, and 20d, via the second wire set 27 based on a rotating instruction command from the control part 8.

Since the liquid crystal lenses for the geometric transformation lens 20a and 20b in the input-side lens set 18a and the liquid crystal lenses for the geometric transformation lens 20c and 20d in the output-side lens set 18b have the same structure as described above, the liquid crystal lens for the geometric transformation lens 20a, one of the two liquid crystal lenses 20a and 20b of the input-side lens set 18a, will be focused in the following description in order to avoid overlapped explanation. In practice, as shown in FIG. 5, the liquid crystal lens for the geometric transformation lens 20a of this disclosure has a multi-layer structure as putting the standard electrode 30 made of a transparent electrode material, the liquid crystal layer 23, and the second substrate 22 made of a transparent material, in this order, on the first substrate 21 made of a transparent material such as glass, where the second substrate 22 also has ITO electrode layer 31.

In this embodiment, as shown in FIG. 4, with respect to the liquid crystal lenses for the geometric transformation lens 20a and 20b in the input-side lens set 18a, the ITO electrode layer 31 is put on the side of the input lens part 17. The luminous flux passing through the input lens part 17 passes through each layer and part by the order of the ITO electrode layer 31, the second substrate 22, the liquid lens layer 23, the standard electrode 30, and the first substrate 21. On the other hand, in the liquid crystal lenses for the geometric transformation lens 20c and 20d in the output-side lens set 18b, the first substrate 21 is put on the side of the flux correction lens 24 and the ITO electrode layer 31 is put on the side of the output lens part 19. The luminous flux passing through the liquid crystal lenses 20a and 20b in the input-side lens set 18a and the flux collection lens 24 passes through each layer and part by the order of the first substrate 21, the standard electrode 30, the liquid lens layer 23, the second substrate 22, and the ITO electrode layer 31.

Figure 6:
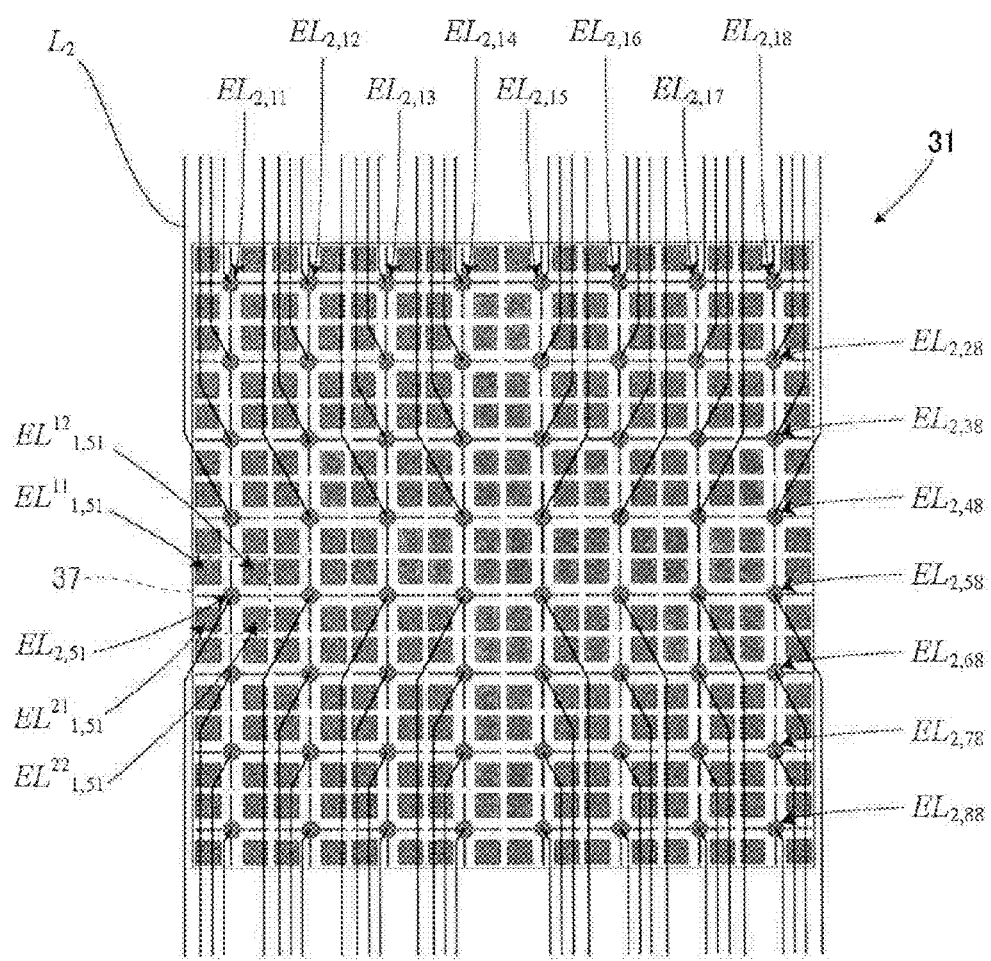
FIG. 6 shows a schematic view of the whole composition of an ITO electrode layer.

In this embodiment, the ITO electrode 31 is put on the entire input surface of the liquid crystal lens for the geometric transformation lens 20a, and has an electrode, $EL_{2,mn}$, for magnifying/demagnifying (m is a row number of the matrix, and n is a column number of the matrix where m and n are an integer from 1 to 8) in a manner of for example, 8 in the longitudinal, 8 in the lateral, and total 8×8 matrix as shown in FIG. 6. Each magnifying/demagnifying electrode $EL_{2,mn}$ is connected with a magnifying/demagnifying voltage wire $L_2$. In the ITO electrode 31, a magnification instruction voltage $V_{2,mn}$ (m and n denote the corresponding magnifying/demagnifying electrode $EL_{2,mn}$, where m and n are an integer from 1 to 8) is applied from the driving circuit 16 to a determined magnifying/demagnifying electrode $EL_{2,mn}$ via magnifying/demagnifying voltage wire $L_2$, based on, for example, a magnifying instruction signal from the control part 8.

Figure 5:
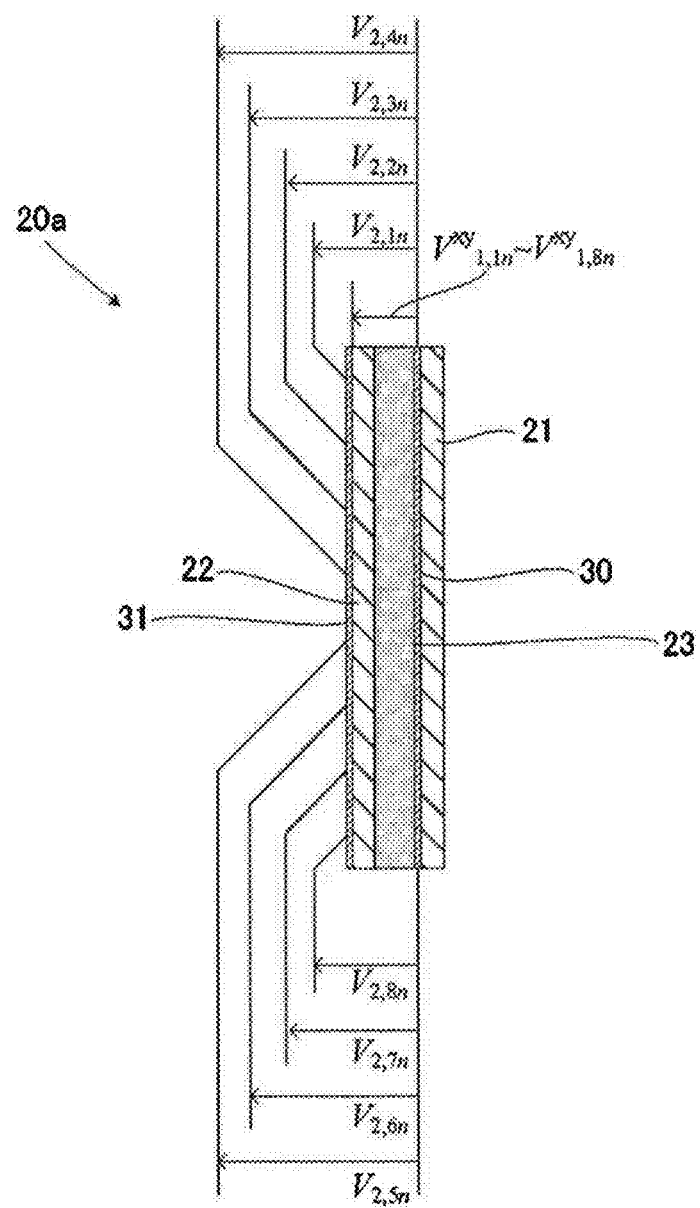
FIG. 5 shows a schematic view of a sectional side view of a liquid crystal lens for a geometric transformation lens.

For example, as shown in FIG. 5, focusing attention to the magnifying/demagnifying electrodes $E_{2,1n}$ to $EL_{2,8n}$ in the n-th column of the ITO electrode layer 31, the electrode $EL_{2,1n}$, for magnifying/demagnifying in the first column, the electrode $EL_{2,2n}$ in the second column, the electrode $EL_{2,3n}$ in the third column, the electrode $EL_{2,4n}$ in the 4th column, the electrode $EL_{2,5n}$ in the 5th column, the electrode $EL_{2,6n}$ in the 6th column, the electrode $EL_{2,7n}$ in the 7th column, and the electrode $EL_{2,8n}$ in the 8th column, are supplied the magnification instruction voltages $V_{2,1n}$, $V_{2,2n}$, $V_{2,3n}$, $V_{2,4n}$, $V_{2,5n}$, $V_{2,6n}$, $V_{2,7n}$, and $V_{2,8n}$, respectively as desired, from the driving circuit 16 based on the magnifying instruction signal. Subscript '2' in the symbols $EL_{2,mn}$, $L_2$, and $V_{2,mn}$ is the numeral sign to distinguish from the electrodes such as rotating electrode to be described later.

In the liquid crystal lens for the geometric transformation lens 20a, when the magnification instruction voltage $V_{2,mn}$ is applied from the driving circuit 16 to a single or multiple magnifying/demagnifying electrodes $EL_{2,mn}$, the orientation state of the tilt angle of the molecules in the liquid crystal of the liquid crystal lens layer 23 facing this single or multiple magnifying/demagnifying electrode(s) $EL_{2,mn}$ changes according to a value of the magnification instruction voltage $V_{2,mn}$, i.e., the orientation state of these molecules in the liquid crystal becomes a state of refraction index distribution that can perform the same function as an aspherical convex lens by which the projection image of the target is magnified optically, i.e. the aspherical convex lens having a focal length that becomes smaller with distance from the center.

Figure 7A:
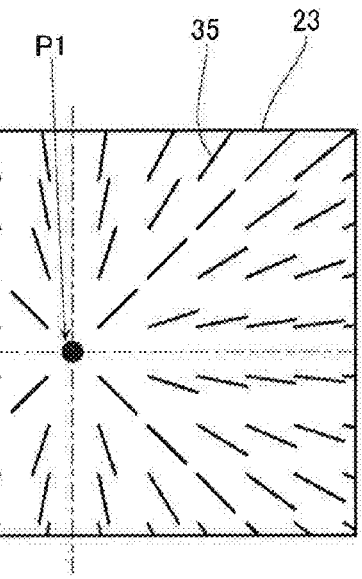
FIG. 7A shows a schematic view of an orientation state of molecules in a liquid crystal when a magnifying process is done.
Figure 7C:
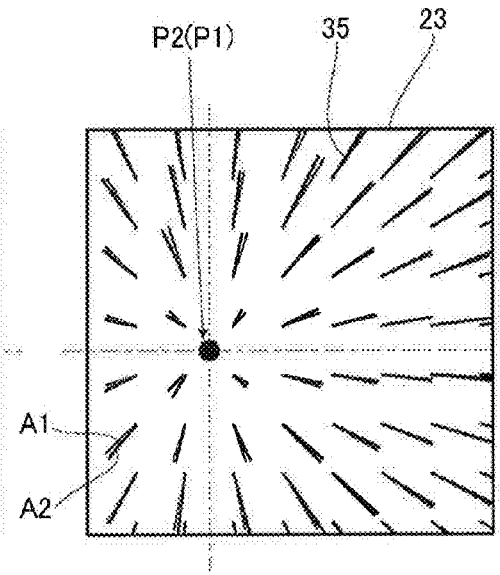
FIG. 7C shows a schematic view of an orientation state of molecules in a liquid crystal when a rotating process is done.
Figure 7B:
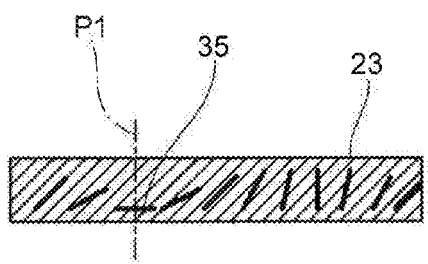
FIG. 7B shows a schematic view of an orientation state of molecules in a liquid crystal when a magnifying process is done.

FIG. 7A shows a virtual imaginary schematic view of the orientation state of the molecules 35 in the liquid crystal of the whole liquid crystal lens layer 23 when, for example, a given point in the image displayed at the display 5 is determined as a designated magnifying point P1. FIG. 7B shows a sectional side view of FIG. 7B. Actually, although the molecules 35 in the liquid crystal are multi-layered in the liquid crystal lens layer 23, FIGS. 7A and 7B are illustrated briefly focusing attention to in-line molecules in the liquid crystal. In addition, FIGS. 7A and 7B are imaginary sketches when regarding a multi-layer structure composed of the liquid crystal lens for the geometric transformation lens 20a (the first layer) and the liquid crystal lens for the geometric transformation lens 20b (the second layer) where the basic orientation direction of the molecules in the liquid crystal of the second layer are orthogonally-crossed with the orientation direction of the molecules in the liquid crystal of the first layer as a single liquid crystal layer (Thus, the molecules 35 in the liquid crystal are illustrated as being oriented radially around the designated magnifying point).

In this case, the orientation state of the tilt angle of the liquid crystal lens 35 in the liquid crystal lens layer 23 is controlled by applying the magnification instruction voltage $V_{2,mn}$ to the magnifying/demagnifying electrode $EL_{2,mn}$ facing the designated magnifying point P1. Such orientation state of the molecules 35 in the liquid crystal are imagined virtually by at least two-layer structure composed of the liquid crystal lens for the geometric transformation lens 20a. In case of a single layer, the orientation of the molecules 35 in the liquid crystal is constrained to in the basic orientation direction due to characteristic of the liquid crystal as being closer to the first substrate 21 and the second substrate 22.

The molecules 35 in the liquid crystal closer to the first substrate 21 and the second substrate 22 where the rubbing process is done can be an elliptical structure having mono-refraction property by which only the tilt angle of the molecules in the liquid crystal rotate is changed by the magnification instruction voltage. On the other hand, the molecules 35 in the liquid crystal far from the first substrate 21 and the second substrate 22 where the rubbing process is done can be an elliptical structure having bi-refraction property in which the refraction in the short-axis direction and that in the long-axis direction are different because the constraint in the basic orientation direction gets weaker as the molecules in the liquid crystal become far away from the first substrate 21 and the second substrate 22 where the rubbing process is done. Thus, the luminous flux passing through the liquid crystal lens layer 23 can be refracted in a desired direction by controlling the orientation state.

In this embodiment, in the liquid crystal lens layer 23, the molecules 35 in the liquid crystal oriented uni-directionally (in the optical axis direction which is orthogonally-crossed to the surface of the liquid crystal lens layer 23) are oriented radially around the designated magnifying point P1, as the magnifying center, as shown in FIG. 7A by applying the magnification instruction voltage $V_{2,mn}$ to the magnifying/demagnifying electrode $EL_{2,mn}$ facing the designated magnifying point P1 (This is a virtual image when two layers arranged as the molecules in one liquid crystal layer are orthogonal to those in the other is regarded as a single liquid crystal layer).

In addition, in the liquid crystal lens layer 23, as shown in FIG. 7B, the long-axis direction of the molecules 35 in the liquid crystal facing the designated magnifying point P1 is oriented as being almost parallel to the surface direction of the liquid crystal layer 23, and the long-axis direction of the molecules 35 in the liquid crystal get more oriented gradually close towards the optical axis direction as getting far away from the designated magnifying point P1, i.e., the long-axis direction of the molecules 35 in the liquid crystal which are far away from the designated magnifying point P1 and not influenced from the magnification instruction electrode $EL_{2,mn}$ become parallel to the optical axis direction.

Thus, in the liquid crystal lens layer 23, the designated magnifying point P1 corresponds to a convex top part of the aspherical convex lens, the molecules 35 in the liquid crystal are oriented as being the distribution of refraction index so as to function similar to the aspherical convex lens where a focal length decreases with distance from the designated magnifying point P1 as the magnifying center. Therefore, the liquid crystal lenses for the geometric transformation lenses 20a, 20b, 20c and 20d focus the target projection image magnified around the designated magnifying point P1 on the solid-state imaging chip by refracting the luminous flux with the molecules 35 in the liquid crystal actualizing such aspherical convex lens where the center is the designated magnifying point P1 and its focal length gets smaller with distance from the center, when the luminous flux from the target enters geometric transformation lenses.

In the liquid crystal lens for the geometric transformation lens 20a, when the refraction instruction voltage $V'_{2,mn}$ is applied from the driving circuit 16 to a single or multiple magnifying/demagnifying electrodes $EL_{2,mn}$, the orientation state of the molecules 35 in the liquid crystal of the liquid crystal lens layer 23 facing this magnifying/demagnifying electrode $EL_{2,mn}$ changes according to a value of the demagnification instruction voltage $V'_{2,mn}$, and the orientation state of these molecules in the liquid crystal can be a state of the distribution of refraction index which has the same function as an aspherical concave lens where the projection image of the target is demagnified optically (the aspherical concave lens in which a focal length becomes larger with distance from the center of the lens).

Specifically, in this embodiment, in the liquid crystal lens layer 23, the molecules 35 in the liquid crystal oriented uni-directionally by the standard voltage are oriented radial-symmetrically around the designated demagnifying point P1 as the demagnifying center, by applying the demagnification instruction voltage $V'_{2,mn}$ to the magnifying/demagnifying electrode $EL_{2,mn}$ facing the designated demagnifying point (This is a virtual image when two layers arranged as the molecules in one liquid crystal layer are orthogonal to those in the other is regarded as a single liquid crystal layer).

In addition, in the liquid crystal lens layer 23 of this case, the long-axis direction of the molecules 35 in the liquid crystal facing the designated demagnifying point is oriented as being up-side-down of FIG. 7B, differently from a case of the aspherical convex lens, and the long-axis direction of the molecules 35 in the liquid crystal get more oriented gradually close towards the optical axis direction as getting far away from the designated demagnifying point, i.e., the long-axis direction of the molecules 35 in the liquid crystal which are far away from the designated demagnifying point and not influenced from the demagnification instruction electrode become parallel to the optical axis direction. Thus, in the liquid crystal lens layer 23, the designated demagnifying point corresponds to the concave bottom part of the aspherical concave lens, the molecules 35 in the liquid crystal are oriented as being the distribution of refraction index of the aspherical concave lens where a focal length increases with distance from the designated demagnifying point as the demagnifying center.

Therefore, when the luminous flux from the target is entered, the liquid crystal lenses for the geometric transformation lenses 20a, 20b, 20c and 20d focus the target projection image, which is demagnified around the designated demagnifying point and increases its magnification as getting far away from the designated demagnifying point, on the solid-state imaging chip by refracting the luminous flux based on the molecules 35 in the liquid crystal forming the aspherical concave lens where the center is the designated demagnifying point and its focal length gets larger with distance from the center.

In addition to the above configuration, as shown in FIG. 6, in the ITO electrode layer 31, focusing attention to a single magnifying/demagnifying electrode $EL_{2,51}$, for example, the total 4 (2 in the longitudinal and 2 in the lateral) rotating electrodes $EL^{11}_{1,51}$, $EL^{12}_{1,51}$, $EL^{21}_{1,51}$, and $EL^{22}_{1,51}$ by 2×2 are put around the magnifying/demagnifying electrode, $EL_{2,51}$, as the center. Thus, a set of electrode cell 37 is composed of a single magnifying/demagnifying electrode $EL_{2,51}$ and 4 rotating electrodes $EL^{11}_{1,51}$, $EL^{12}_{1,51}$, $EL^{21}_{1,51}$, and $EL^{22}_{1,51}$.

In such a manner, in the ITO electrode layer, each magnifying/demagnifying electrode $EL_{2,mn}$ is provided as the center and the total 4 rotating electrodes $EL^{xy}_{1,mn}$ by 2×2, 2 in the longitudinal and 2 in the lateral, (where m and n correspond to the row number mth and the column number nth of the magnifying/demagnifying electrode $EL_{2,mn}$, respectively, i.e., m and n are any integer from 1 to 8, and where x and y are integers 1 or 2 which denotes a position of the rotating electrodes by matrix) are arranged around the magnifying/demagnifying electrode $EL_{2,mn}$ respectively, and thus, as a whole, these rotating electrodes $EL^{xy}_{1,mn}$ are spaced out regularly.

Figure 8A:
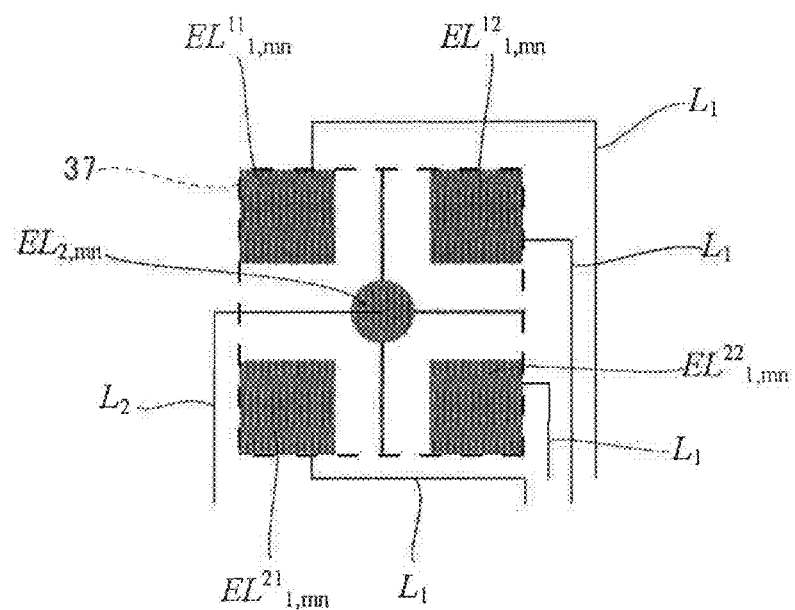
FIG. 8A shows a schematic view of the whole composition of an electrode cell.

As shown in FIG. 8A, in this embodiment, the electrode cell 37 has a composition as having a magnifying/demagnifying electrode $EL_{2,mn}$ with a circular shape at the center and aligning 4 square-shaped electrodes $EL^{11}_{1,mn}$, $EL^{12}_{1,mn}$, $EL^{21}_{1,mn}$, and $EL^{22}_{1,mn}$ for rotating at each of 4 corners around the electrode $EL_{2,mn}$. In the electrode cell 37, rotating voltage wires $L_1$ are connected to the rotating electrodes $EL^{11}_{1,mn}$, $EL^{12}_{1,mn}$, $EL^{21}_{1,mn}$, and $EL^{22}_{1,mn}$, respectively. The driving circuit 16 applies the rotation instruction voltages $V^{11}_{1,mn}$, $V^{12}_{1,mn}$, $V^{21}_{1,mn}$, and $V^{22}_{1,mn}$ to the rotating electrodes $EL^{11}_{1,mn}$, $EL^{12}_{1,mn}$, $EL^{21}_{1,mn}$, and $EL^{22}_{1,mn}$ respectively via the rotating voltage wires $L_1$ for each. In response to the rotation instruction voltages, the rotating electrodes $EL^{11}_{1,mn}$, $EL^{12}_{1,mn}$, $EL^{21}_{1,mn}$, and $EL^{22}_{1,mn}$ rotate the molecules 35 in the liquid crystal by a given angle to change the refraction index in the liquid crystal layer 23. At this time, the molecules 35 in the liquid crystal can be translated in the direction parallel to the liquid crystal surface at each position facing 4 regions of between the rotating electrodes $EL^{11}_{1,mn}$ and $EL^{12}_{1,mn}$, between the rotating electrodes $EL^{12}_{1,mn}$ and $EL^{22}_{1,mn}$, between the rotating electrodes $EL^{22}_{1,mn}$ and $EL^{21}_{1,mn}$, and between the rotating electrodes $EL^{21}_{1,mn}$ and $EL^{11}_{1,mn}$.

Also at this time, in the liquid crystal lens layer 23 facing the electrode cell 37, the molecules 35 in the liquid crystal, which are free from the constraint of the orientation direction of the liquid crystal to some degree when they are far from the substrates (the first or second substrate 21, 22 after rubbing), rotate around the axis vertical to the liquid crystal lens surface in addition to the normal rotation. Thus, the electrode cell 37 can rotate the target projection image focused on the solid-state imaging chip, based on the parallel translation and the rotation of the molecules 35 in the liquid crystal where the rotation around the axis is combined with the normal rotation.

A composition of the electrodes is explained in FIG. 6 and FIG. 8A as focusing attention to a case of the single liquid crystal layer in which the molecules in the liquid crystal are oriented in one direction in order to understand its mechanism more easily. But in order to explain its actual performance, in view of the anisotropy of the orientation direction of the molecules in the liquid crystal, it needs to be taken into account 2 layers, simultaneously, where their orientation directions are orthogonal to each other, such as the input side lens set 18a having the two-layer structure composed of the two liquid crystal lens for the geometric transformation lens 20a and 20b, and the output side lens set 18b having the two-layer structure composed of the two liquid crystal lens for the geometric transformation lens 20c and 20d where their orientation directions are orthogonal to each other although they have the same electrode pattern. In FIG. 6, the rotating voltage wire $L_1$ which is connected to each rotating electrode $EL^{xy}_{1,mn}$ is omitted and not illustrated. With respect to the rotating electrode $EL^{xy}_{1,mn}$, the rotating voltage wire $L_1$, and the rotation instruction voltage $V^{xy}_{1,mn}$, the subscript '1' is attached to discriminate from the abovementioned magnifying/demagnifying electrode $EL_{2,mn}$ and so on.

Figure 7D:
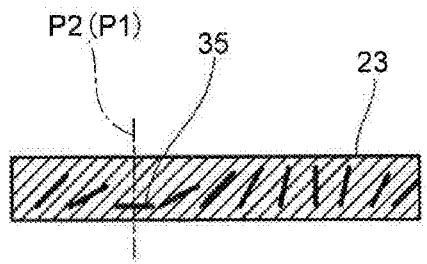
FIG. 7D shows a schematic view of an orientation state of molecules in a liquid crystal when a rotating process is done.

For example, as shown in FIGS. 7A and 7B, in order to rotate the whole image, where the orientation state of the molecules 35 in the liquid crystal is changed by magnifying process, around the designated magnifying point P1 as the rotation center, the rotation instruction voltage $V^{xy}_{1,mn}$ is applied to each rotating electrode $EL^{xy}_{1,mn}$ based on input operation in the operation part. As shown in FIGS. 7C and 7D, in the liquid crystal lens layer 23, the molecules 35 in the liquid crystal oriented radially around the magnifying/demagnifying electrode $EL_{2,mn}$, applied the magnification instruction voltage $V_{2,mn}$ thereto, as the center are rotated around the rotation center P2 as they keep their state by a given angle to allow the orientation state to change.

For example, FIG. 7C shows the molecules 35 in the liquid crystal before rotating by light lines A1 and the molecules 35 in the liquid crystal after rotating by dark lines A2. The molecules 35 in the liquid crystal are rotated slightly around the rotation center P2 in a counterclockwise direction by applying the rotation instruction voltage $V^{xy}_{1,mn}$ to each rotating electrode $EL^{xy}_{1,mn}$. Thus, the liquid crystal lenses for the geometric transformation lens 20a, 20b, 20c and 20d focus the target projection image, which is rotated around the rotation center P2, on the solid-state imaging chip by refracting the luminous flux input from the target based on the molecules 35 in the liquid crystal being rotated around the rotation center P2 by a given angle.

The present invention is not limited to this embodiment, but it is applicable for other various configurations of implementation within the scope of the invention. For example, as shown in FIG. 8A, the abovementioned embodiment describes the case that the electrode cell 37 has the 4 square-shaped electrodes, $EL^{11}_{1,mn}$, $EL^{12}_{1,mn}$, $EL^{21}_{1,mn}$, and $EL^{22}_{1,mn}$, for rotating aligned at each of 4 corners around a small circular electrode, $EL_{2,mn}$, for magnifying/demagnifying as the center and a large space for the wires are made between such the electrode, $EL_{2,mn}$, for magnifying/demagnifying, and each of the electrodes, $EL^{11}_{1,mn}$, $EL^{12}_{1,mn}$, $EL^{21}_{1,mn}$, and $EL^{22}_{1,mn}$, for rotating. This invention is not limited to this embodiment, but applicable to make the space for the wires be smaller as various compositions of electrode alignment by designing various shapes of such the magnifying/demagnifying electrode, $EL_{2,mn}$, and the rotating electrodes $EL^{11}_{1,mn}$, $EL^{12}_{1,mn}$, $EL^{21}_{1,mn}$, and $EL^{22}_{1,mn}$.

Figure 8B:
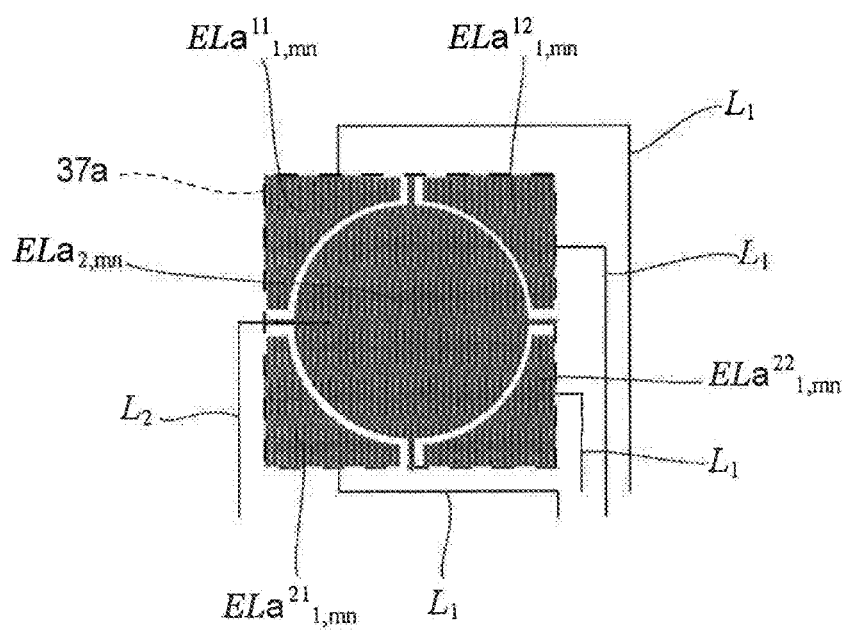
FIG. 8B shows a schematic view of the whole composition of an electrode cell.

For example, as shown in FIG. 8B, another composition of an-electrode cell 37a can be provided, where a comparatively-large circular electrode, $ELa_{2,mn}$, for magnifying/demagnifying, in which its diameter is close to a edge length of the cell, is aligned at the center and 4 electrodes, $ELa^{11}_{1,mn}$, $ELa^{12}_{1,mn}$, $ELa^{21}_{1,mn}$, and $ELa^{22}_{1,mn}$, for rotating are aligned at each of 4 corners of the cell as surrounding the electrode, $ELa_{2,mn}$, for magnifying/demagnifying.

In this case, a side of the electrodes, $ELa^{11}_{1,mn}$, $ELa^{12}_{1,mn}$, $ELa^{21}_{1,mn}$, and $ELa^{22}_{1,mn}$, for rotating is formed as a circularly-curved shape according to a circularly-curved outer shape of the electrode, $ELa_{2,mn}$, for magnifying/demagnifying, and is aligned along the outer shape of the abovementioned electrode, $ELa_{2,mn}$, for magnifying/demagnifying. By this electrode pattern, the electrode cell 37a has a greatly smaller gap between the electrode, $EL_{2,mn}$, for magnifying/demagnifying and each of the electrodes, $EL^{11}_{1,mn}$, $EL^{12}_{1,mn}$, $EL^{21}_{1,mn}$, and $EL^{22}_{1,mn}$, for rotating, compared to the electrode cell 37 as shown in FIG. 8A. This can make its space for the wiring be smaller, and can align the electrode, $EL_{2,mn}$, for magnifying/demagnifying and the electrodes, $EL^{11}_{1,mn}$, $EL^{12}_{1,mn}$, $EL^{21}_{1,mn}$, and $EL^{22}_{1,mn}$, for rotating over an inside region of the cell.

This electrode cell 37a can control the orientation state of the tilt angle of the molecules 35 in the liquid crystal within a wider area and conduct magnifying and demagnifying processes by one magnifying/demagnifying electrode $EL_{2,mn}$ because the magnifying/demagnifying electrode $EL_{2,mn}$ is formed more largely.

Further, as shown in FIG. 6, the abovementioned embodiment describes the case that all of the multiple magnifying/demagnifying electrodes $EL_{2,mn}$ to magnify, demagnify and translate parallel the target projection image and the multiple rotating electrodes $EL^{11}_{1,mn}$, $EL^{12}_{1,mn}$, $EL^{21}_{1,mn}$, and $EL^{22}_{1,mn}$ to rotate the target projection image are formed in the single ITO electrode layer 31. The present invention is not limited to this embodiment, but only the multiple magnifying/demagnifying electrodes $EL_{2,mn}$ to magnify, demagnify and translate parallel the target projection image can be formed in a single ITO electrode layer 31a as shown in FIG. 9A. In this case, only the multiple rotating electrodes $EL^{11}_{1,mn}$, $EL^{12}_{1,mn}$, $EL^{21}_{1,mn}$, and $EL^{22}_{1,mn}$ to rotate the target projection image are formed in another single ITO electrode layer 31b as shown in FIG. 9B, and thereby replacing the ITO electrode layer 31 as shown in FIG. 6 with the multiple ITO electrode layers 31a and 31b.

In this case, it can be processed more easily in their production, because wiring patterns of the ITO electrode layers 31a and 31b become more simplified by omitting the rotating electrodes $EL^{11}_{1,mn}$, $EL^{12}_{1,mn}$, $EL^{21}_{1,mn}$, and $EL^{22}_{1,mn}$ and the magnifying/demagnifying electrodes $EL_{2,mn}$ from the ITO electrode layers 31a and 31b. In addition, due to such omission of the rotating electrodes $EL^{11}_{1,mn}$, $EL^{12}_{1,mn}$, $EL^{21}_{1,mn}$, and $EL^{22}_{1,mn}$ and the magnifying/demagnifying electrodes $EL_{2,mn}$ from the ITO electrode layers 31a and 31b, it can reduce the number of wires led from the electrodes, and thus improve their integration by making the space where the wires are patterned be smaller.

In addition, this ITO electrode layer 31a can simplify to control voltages applying to the magnifying/demagnifying electrodes $EL_{2,mn}$ completely apart from controlling voltages applying to the rotating electrodes $EL^{11}_{1,mn}$, $EL^{12}_{1,mn}$, $EL^{21}_{1,mn}$, and $EL^{22}_{1,mn}$ which is used for the rotating process when the magnifying/demagnifying processes and the parallel translation process are carried out, because the ITO electrode layer 31a has only the magnifying/demagnifying electrodes $EL_{2,mn}$. The ITO electrode layer 31b also can simplify to control voltages applying to the rotating electrodes $EL^{11}_{1,mn}$, $EL^{12}_{1,mn}$, $EL^{21}_{1,mn}$, and $EL^{22}_{1,mn}$ completely apart from controlling voltages applying to the magnifying/demagnifying electrodes $EL_{2,mn}$ which is used for the magnifying/demagnifying processes and the parallel translation process when the rotating process is carried out, because the ITO electrode layer 31b has only the rotating electrodes $EL^{11}_{1,mn}$, $EL^{12}_{1,mn}$, $E^{21}_{1,mn}$, and $EL^{22}_{1,mn}$.

As for another embodiment, a composition of the inside lens part can be achieved by a multi-layer structure where a liquid crystal lens for the geometric transformation lens which can carry out only the parallel translation process as shown in FIG. 10A, a liquid crystal lens for the geometric transformation lens which can carry out only the magnifying/demagnifying process as shown in FIG. 10B, and a liquid crystal lens for the geometric transformation lens which can carry out only the rotating process as shown in FIG. 10C, are combined together. Or the structure of the inside lens part can be achieved by combining any two of the above 3 types of the liquid crystal lens for the geometric transformation lens. When such the 3 types of the liquid crystal lens for the geometric transformation lens are layered, an order of the parallel translation process, magnifying/demagnifying process, and the rotating process should be noted in order to acquire the target projection image which is equal to the abovementioned embodiment.

Actually, as shown in FIG. 10A, the liquid crystal lens for the geometric transformation lens which can carry out only the parallel translation process is composed of a first layer 50a and a second layer 50b, and has the two-layer structure where the rubbing direction of the first layer 50a and that of the second layer 50b are orthogonal. FIG. 10A shows a top view of the first layer 50a and the second layer 50b. The first layer 50a has a liquid crystal layer 53a between an ITO electrode layer 51a aligned at one side and an opposite ITO electrode 52a aligned at the other side. The molecules in the liquid crystal of the liquid crystal layer 53a can change its orientation state when a voltage is applied to the ITO electrode layer 51a.

Similarly, the second layer 50b also has a liquid crystal layer 53b between an ITO electrode layer 51b aligned at one side and an opposite ITO electrode 52b aligned at the other side. The molecules in the liquid crystal of the liquid crystal layer 53b can change its orientation state when a voltage is applied to the ITO electrode layer 51b. Thus, the liquid crystal lens for the geometric transformation lens as shown in FIG. 10A can translate parallel the target projection image focused on the solid-state imaging chip by changing arbitrarily the orientation states of the molecules in the liquid crystal of the first layer 50a and the second layer 50b, respectively, where their rubbing directions are orthogonal to each other.

In addition, as shown in FIG. 10B, the liquid crystal lens for the geometric transformation lens which can carry out only the magnifying/demagnifying processes is composed of a first layer 55a and a second layer 55b, and has the two-layer structure where the rubbing direction of the first layer 55a and that of the second layer 55b are orthogonal. FIG. 10B shows a top view of the first layer 55a and the second layer 55b. The first layer 55a has a liquid crystal layer between an ITO electrode layer 56a and an opposite ITO electrode facing this ITO electrode layer 56a (not illustrated). The molecules in the liquid crystal of the liquid crystal layer can change its orientation state when a voltage is applied to the ITO electrode layer 56a.

Similarly, the second layer 55b also has a liquid crystal layer between an ITO electrode layer 56b and an opposite ITO electrode facing an ITO electrode layer 56b (not illustrated). The molecules in the liquid crystal of the liquid crystal layer can change its orientation state when a voltage is applied to the ITO electrode layer 56b. Thus, the liquid crystal lens for the geometric transformation lens as shown in FIG. 10B can magnify and demagnify the target projection image focused on the solid-state imaging chip by changing arbitrarily the orientation states of the molecules in the liquid crystal of the first layer 55a and the second layer 55b, respectively, where their rubbing directions are orthogonal to each other.

Moreover, as shown in FIG. 10C, the liquid crystal lens for the geometric transformation lens which can carry out only the rotating process is composed of a first layer 60a and a second layer 60b, and has the two-layer structure where the rubbing direction of the first layer 60a and that of the second layer 60b are orthogonal. FIG. 10C shows a top view of the first layer 60a and the second layer 60b. The first layer 60a has a patterning as aligning each planar part of an opposite electrode 61a and an ITO electrode layer 62a in a linear arrangement at one side.

In addition, the first layer 60a has a patterning as aligning each planar part of an ITO electrode layer 63a and an opposite electrode 64a in a linear arrangement at the other side. The ITO electrode layer 63a is aligned as facing the opposite electrode 61a at one side, and the opposite electrode 64a is aligned as facing to the ITO electrode layer 62a at one side, as well.

The first layer 60a has a liquid crystal layer between a pair of the opposite electrode 61a and the ITO electrode layer 62a and another pair of the ITO electrode layer 63a and the opposite electrode 64a. The molecules in the liquid crystal of the liquid crystal layer can change its orientation state when a voltage is applied to the ITO electrode layers 62a and 63a.

On the other hand, a second layer 60b also has a patterning as aligning each planar part of an opposite electrode 61b and an ITO electrode layer 62b in a linear arrangement at one side. In addition, a second layer 60b also has a patterning as aligning each planar part of an ITO electrode layer 63b and an opposite electrode 64b in a linear arrangement at the other side. The ITO electrode layer 63b is aligned as facing the opposite electrode 61b at one side. Similarly, the opposite electrode 64b is aligned as facing the ITO electrode layer 62b at one side.

The second layer 60b has a liquid crystal layer between a pair of the opposite electrode 61b and the ITO electrode layer 62b and another pair of the ITO electrode layer 63b and the opposite electrode 64b. The molecules in the liquid crystal of the liquid crystal layer can change its orientation state when a voltage is applied to the ITO electrode layers 62b and 63b. Thus, the liquid crystal lens for the geometric transformation lens as shown in FIG. 10C can rotate the target projection image focused on the solid-state imaging chip by changing arbitrarily the orientation states of the molecules in the liquid crystal of the first layer 60a and the second layer 60b, respectively, where their rubbing directions are orthogonal to each other.

(3) Operation and Effects

In the abovementioned configuration, the liquid crystal lenses for the geometric transformation lens 20a, 20b, 20c and 20d have the liquid crystal lens layer 23, where the molecules 35 in the liquid crystal are oriented uni-directionally, provided between the first substrate 21 and the second substrate 22, and the ITO electrode layer 31, where the magnifying/demagnifying electrodes $EL_{2,mn}$ are aligned in a matrix form, set on the liquid crystal lens layer 23. In the liquid crystal lenses for the geometric transformation lens 20a, 20b, 20c and 20d, when a single region or multiple regions in the projection image are designated as the region to be magnified, the magnification instruction voltage $V_{2,mn}$ is supplied to the single or the multiple magnifying/demagnifying electrodes $EL_{2,mn}$ corresponding to the designated magnifying point P1, and the molecules 35 in the liquid crystal of the liquid crystal lens layer 23 facing the corresponding magnifying/demagnifying electrodes $EL_{2,mn}$ are oriented as being the distribution of refraction index by which the molecules 35 in the liquid crystal serve as the aspherical convex lens where a focal length gets smaller with distance from the designated point. Thus, when the luminous flux from the target passes through the liquid crystal lenses for the geometric transformation lens 20a, 20b, 20c and 20d, the target projection image, magnified around the designated magnifying point P1 as the magnifying center, is focused on the solid-state imaging chip by changing the distribution of refraction index by the molecules 35 in the liquid crystal where the oriented state is changed.

Hence, the liquid crystal lenses for the geometric transformation lens 20a, 20b, 20c and 20d can increase resolution of the region where the users want to magnify, keeping the wide field of view without increasing the data amount of the whole image, based on changing the orientation state of the molecules 35 in the liquid crystal of the liquid crystal layer 23 to magnify the region desired by the users by applying the magnification instruction voltage $V_{2,mn}$ to the corresponding magnifying/demagnifying electrodes $EL_{2,mn}$ simply.

Based on the above, when another target to be observed more in detail is inside the field of view, the liquid crystal lenses for the geometric transformation lens 20a, 20b, 20c and 20d can magnify optically the desired region in the target projection image by applying the magnification instruction voltage $V_{2,mn}$ to the corresponding magnifying/demagnifying electrodes $EL_{2,mn}$ simply without moving the lens itself using heavy mechanical parts motorized. This can save spaces for setting the existing mechanical parts to control the direction of the lens and for the motion of the lens. This can also achieve reducing energy consumption because only the molecules 35 in the liquid crystal is needed to move and such the mechanical parts moving are not required.

In addition, the liquid crystal lenses for the geometric transformation lens 20a, 20b, 20c and 20d can change the distribution of refraction index by changing the orientation state of the molecules 35 in the liquid crystal of the multiple regions simultaneously by applying the magnification instruction voltage $V_{2,mn}$ to the magnifying/demagnifying electrodes $EL_{2,mn}$ set on a desired point at the same time, because the ITO electrode layer 31 has the multiple magnifying/demagnifying electrodes $EL_{2,mn}$ aligned on the liquid crystal lens layer 23 as a matrix pattern. Thus, the liquid crystal lenses for the geometric transformation lens 20a, 20b, 20c and 20d also can focus the projection image where the multiple regions are, at the same time, magnified around the multiple magnification designated points P1 as each magnifying center, on the solid-state imaging chip.

In the imaging device 1 using such the liquid crystal lenses for the geometric transformation lens 20a, 20b, 20c and 20d, the imaging part 3 sends the image signal, where a single or multiple regions of the target are magnified in the abovementioned manner, to the input image correction part 4. The input image correction part 4 demagnifies the regions magnified by the liquid crystal lenses for the geometric transformation lens 20a, 20b, 20c and 20d, again to the original magnification. Thus, the imaging device 1 displays the demagnified image as the projection image on the display 5 after demagnifying the regions magnified by the geometric transformation lenses 20a, 20b, 20c and 20d, to the original magnification again via the input image correction part 4. Accordingly, it can display no unnaturally-distorted image which has the regions having improved resolution magnified by the liquid crystal lenses for the geometric transformation lens 20a, 20b, 20c and 20d but a more naturally-undistorted image having the same magnification entirely to the users.

In addition to that, in the liquid crystal lenses for the geometric transformation lens 20a, 20b, 20c and 20d, when a single region or multiple regions in the projection image are determined (given) as the demagnifying region, the demagnification instruction voltages $V_{2,mn}$ are applied to the single or the multiple magnifying/demagnifying electrodes $EL_{2,mn}$ corresponding to the given demagnifying points, and the molecules 35 in the liquid crystal of the liquid crystal lens layer 23 facing the corresponding magnifying/demagnifying electrodes $EL_{2,mn}$ are oriented as being the distribution of refraction index by which the molecules 35 in the liquid crystal play a role as the aspherical concave lens where a focal length gets larger with distance from the given point. Thus, when the luminous flux from the target passes through the liquid crystal lenses for the geometric transformation lens 20a, 20b, 20c and 20d, the target projection image, demagnified around the given demagnifying point as the center, is focused on the solid-state imaging chip by changing the refraction index of the luminous flux by the molecules 35 in the liquid crystal where the oriented state is changed.

Hence, the liquid crystal lenses for the geometric transformation lens 20a, 20b, 20c and 20d can demagnify and decrease spatial resolution of the region where the users want to demagnify, and thereby reducing the data amount to be assigned to unnecessary regions, based on changing the orientation state of the molecules 35 in the liquid crystal of the liquid crystal layer 23 by applying the demagnification instruction voltage $V'_{2,mn}$ to the predetermined magnifying/demagnifying electrodes $EL_{2,mn}$ simply.

Based on the above, the liquid crystal lenses for the geometric transformation lens 20a, 20b, 20c and 20d can demagnify optically a desired region in the projection image by applying the demagnification instruction voltage $V'_{2,mn}$ to the corresponding magnifying/demagnifying electrodes $EL_{2,mn}$ simply without moving the lens itself using heavy mechanical parts motorized. This can save spaces for setting the existing mechanical parts to control the direction of the lens and for the motion of the lens. This can also achieve reducing energy consumption because only the molecules 35 in the liquid crystal is needed to move and such the mechanical parts moving are not required.

In addition, the liquid crystal lenses for the geometric transformation lens 20a, 20b, 20c and 20d can change the distribution of refraction index by changing the orientation state of the liquid crystal 35 in the multiple regions simultaneously by applying the demagnification instruction voltage $V'_{2,mn}$ to the multiple corresponding magnifying/demagnifying electrodes $EL_{2,mn}$ at the same time, because the ITO electrode layer 31 has the multiple magnifying/demagnifying electrodes $EL_{2,mn}$ aligned as a matrix pattern on the liquid crystal lens layer 23. Thus, the liquid crystal lenses for the geometric transformation lens 20a, 20b, 20c and 20d also can focus the projection image where the multiple regions are, at the same time, demagnified around the multiple designated demagnifying points as each demagnifying center, on the solid-state imaging chip.

Similarly to the magnifying process, since the input image correction part 4 magnifies the demagnified single region or multiple regions of the target projection image again to the original magnification, the imaging device 1 can display no unnaturally-distorted image which has the regions having reduced resolution demagnified by the liquid crystal lenses for the geometric transformation lens 20a, 20b, 20c and 20d but a more naturally-undistorted projection image having the same magnification entirely to the users.

And by applying the magnification instruction voltages $V_{2,mn}$ to the single or the multiple magnifying/demagnifying electrodes $EL_{2,mn}$ and applying the demagnification instruction voltages $V'_{2,mn}$ to the other multiple or single magnifying/demagnifying electrodes $EL_{2,mn}$ simultaneously, the liquid crystal lenses for the geometric transformation lens 20a, 20b, 20c and 20d can focus the target projection image, magnified around designated magnifying points P1 as the magnifying center points in a given region and demagnified around designated demagnifying points as the demagnifying center points in another given region, simultaneously, on the solid-state imaging chip by refracting the luminous flux from the target via the molecules 35 in the liquid crystal where the oriented state is changed by the magnification instruction voltages $V_{2,mn}$ and the demagnification instruction voltages $V'_{2,mn}$.

Also in this case, since the input image correction part 4 demagnifies the single magnified region or multiple magnified regions of the target projection image again, and magnifies the single demagnified region or multiple demagnified regions of the target projection image again to the original magnification so as to uniform the magnification as a whole, the imaging device 1 can display no unnaturally-distorted image which has the regions magnified and demagnified but a more naturally-undistorted image having the same magnification entirely to the users. In addition, the imaging device 1 can display the projection image with improved resolution by magnifying only the regions as desired without increasing the total data amount of the whole projection image, to the users, because it can reduce the total data amount by demagnifying unnecessary regions while keeping the wide field of view.

Furthermore, in addition to that, in the liquid crystal lenses for the geometric transformation lens 20a, 20b, 20c and 20d, the ITO electrode layer 31 where the multiple rotating electrodes $EL_{1,mn}$ are aligned regularly like a matrix apart from the magnifying/demagnifying electrodes $EL_{2,mn}$ is set on the liquid crystal lens layer 23. When the rotation instruction voltage $V_{1,mn}$ is applied to the rotating electrodes $EL_{1,mn}$ respectively, the orientation state of the molecules 35 in the liquid crystal of the liquid crystal layer 23 facing each rotating electrode $EL_{1,mn}$ changes to allow the molecules 35 in the liquid crystal to rotate by a given angle.

Thus, the liquid crystal lenses for the geometric transformation lens 20a, 20b, 20c and 20d can focus the projection image rotated around the rotation center by an given angle based on the molecules 35 in the liquid crystal on the solid-state imaging chip by changing the distribution of refraction index of the luminous flux by the molecules 35 in the liquid crystal where their orientation state is changed.

According to the above configuration, the liquid crystal layer 23, where the molecules 35 in the liquid crystal are sealed, is set between the first substrate 21 and the second substrate 22, and the orientation of the molecules 35 in the liquid crystal is controlled by a voltage, as an external stimulus, given to the liquid crystal lens layer 23, and thereby achieving the geometric transformation of the target projection image with the orientation change of the molecules 35 in the liquid crystal. Since any conventional mechanical part to move the lens is no longer to be needed in this case, downsizing and reducing energy consumption can be achieved, and the target projection image can be transformed geometrically as desired.

(4) Other Embodiments

The present invention is not limited to the abovementioned embodiment, and is feasible by kinds of different configurations within the scope of the invention. For example, in the abovementioned embodiment, the liquid crystal lens layer 23 having a continuous (not separated) space is disclosed, to which continuous-type liquid crystal lens, 20a, 20b, 20c, and 20d, for a geometric transformation lens are applied, where the ITO electrode layer 31, having a pattern sequentially-aligned with the magnifying/demagnifying electrode $EL_{2,mn}$ and the rotating electrode $EL^{xy}_{1,mn}$, is provided in the liquid crystal lens layer 23. The present invention is not limited to this example, but discrete-type liquid crystal lens for the geometric transformation lens where each electrode cell 37 is combined with each of micro liquid crystal lens cells 41 may be applicable, as shown in FIG. 11. The micro liquid crystal lens cells 41 in which the liquid crystal lens layer 45 is divided by partition plates 40, are connected sequentially in the longitude and lateral directions, and are aligned with array arrangement.

In this case, the micro liquid crystal lens cells 41 used for the discrete-type liquid crystal lens for the geometric transformation lens, for example, have almost the same size as the electrode cells 37, and have a composition where each sealed space, divided by the partition plates 40 made of a transparent material, is filled with the molecules in the liquid crystal. In the discrete-type liquid crystal lens for the geometric transformation lens, by applying the magnification instruction voltage $V_{2,mn}$, the demagnification instruction voltage $V'_{2,mn}$, and the rotation instruction voltage $V^{xy}_{1,mn}$ to the micro liquid crystal lens cells 41 aligned densely with the array arrangement via the electrode cells 37, the orientation state of the molecules in the liquid crystal of each of the micro liquid crystal lens cells 41 can be changed to perform the effect similar to that of the abovementioned embodiment.

FIG. 12A and FIG. 12B showing a sectional side view of FIG. 12A, show a sketch of the liquid crystal lens layer 45 in one of the micro liquid crystal lens cells 41, and show the orientation state of the molecules 35 in the liquid crystal when the pre-tilt angle is cancelled in such liquid crystal lens layer 45. In this case, in the liquid crystal lens layer 45, the molecules 35 in the liquid crystal are arranged to lie in parallel only to the planar direction due to the rubbing process, and then the rotation of the target projection image and the distribution of magnification according to a distance from the magnification center of the target projection image are controlled by the magnification instruction voltage $V_{2,mn}$ and the rotation instruction voltage $V^{xy}_{1,mn}$ applied to the electrode cells 37.

Also in this case, since the orientation direction of the molecules 35 in the liquid crystal is determined according to the direction of the rubbing process, when the pre-tilt angle of the molecules 35 in the liquid crystal is 0 degree, the input side lens set and the output side lens set of the inside lens part have a two-layer structure of the 2 liquid crystal lens for the geometric transformation lens, i.e., the 2 micro liquid crystal lens cells 41 are layered to reduce influence on this anisometric optical system, similarly to the abovementioned embodiment.

For example, the input side lens set has a composition where the direction of the molecules in the liquid crystal of the first layer of the micro liquid lens cell 41 is rotated by 90 degrees from that of the molecules in the liquid crystal of the second layer of the micro liquid lens cell 41 (In other words, to make the two-layer structure from these micro liquid crystal lens cells 41 can be regarded as discretizing the molecules 35 in the liquid crystal in the direction vertical to the top surface of the micro liquid crystal lens cell 41, i.e., in the optical axis direction, in view of the top view of FIG. 12A). Similarly to the abovementioned embodiment, the output side lens set also has a composition where the direction of the molecules in the liquid crystal of the first layer of the micro liquid lens cell 41 is rotated by 90 degrees from that of the molecules in the liquid crystal of the second layer of the micro liquid lens cell 41, in the same way as the input side lens set.

In such micro liquid crystal lens cell 41, at first, the rotation instruction voltage $V^{xy}_{1,mn}$ is applied to the molecules 35 in the liquid crystal as their direction becomes parallel to the rubbing direction when the pre-tilt angle is 0 degree. This state is when the molecules 35 in the liquid crystal are parallel to the planar direction and have no rotation as shown in FIG. 12B. The molecules 35 in the liquid crystal look like FIG. 12A when they are observed from the top of the micro liquid crystal lens cell 41, because the molecules 35 in the liquid crystal, close to the first substrate 21 and the second substrate 22 after giving the rubbing process, are constrained to the rubbing direction as having the pre-tilt angle without any voltage applied. This means that the molecules 35 in the liquid crystal, comparatively far away from the first substrate 21 and the second substrate 22 after giving the rubbing process, need to be applied with the rotation instruction voltage $V^{xy}_{1,mn}$ so as to be the state of no rotation.

Figure 13:
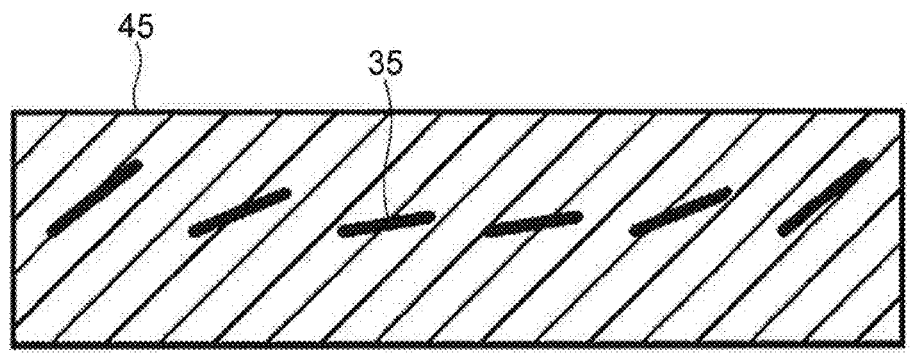
FIG. 13 shows a sectional side view of an orientation state of molecules in a liquid crystal of a micro liquid crystal lens cell when a magnifying process is done.

Then, in the micro liquid crystal lens cell 41, by applying a given magnification instruction voltage $V_{2,mn}$, the molecules 35 in the liquid crystal slightly stand according to the magnification instruction voltage $V_{2,mn}$, i.e., have the tilt angle, as shown in FIG. 13, and the orientation state of the molecules 35 in the liquid crystal can be changed as being the distribution of refraction index having the same function as the aspherical convex lens where a focal length gets smaller with distance from the point to which the magnification instruction voltage applied.

On the other hand, in order to rotate the luminous flux passing through the micro liquid crystal lens cell 41, after applying the magnification instruction voltage $V_{2,mn}$ as the pre-tilt angle of the molecules 35 in the liquid crystal becomes 0 degree, the luminous flux is translated parallel in the direction parallel to the liquid crystal surface at each position facing four regions of between the rotating electrodes $EL^{11}_{1,mn}$ and $EL^{12}_{1,mn}$, between the rotating electrodes $EL^{12}_{1,mn}$ and $EL^{22}_{1,mn}$, between the rotating electrodes $EL^{22}_{1,mn}$ and $EL^{21}_{1,mn}$, and between the rotating electrodes $EL^{21}_{1,mn}$ and $EL^{11}_{1,mn}$ by changing the rotation instruction voltage $V^{xy}_{1,mn}$.

Figure 14:
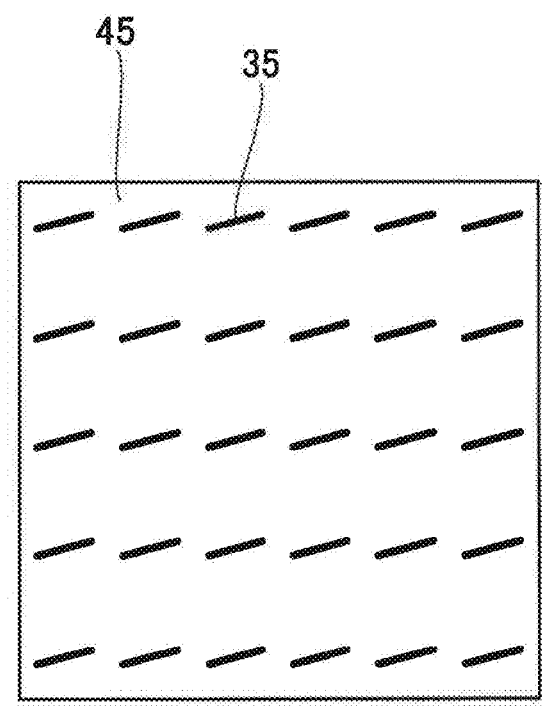
FIG. 14 shows a top view of an orientation state of molecules in a liquid crystal of a micro liquid crystal lens cell when a rotating process is done.

In addition, in the liquid crystal lens layer 37, the molecules 35 in the liquid crystal, which are free from the constraint of the rubbing direction of the liquid crystal to some degree when they are far from the substrates, rotate around the axis vertical to the liquid crystal lens surface in addition to the normal rotation. Thus, the micro liquid crystal lens cell 41 can control not only the tilt angle but also the pan angle of the molecules 35 in the liquid crystal as being constant, as shown in FIG. 14. Hence, also in case of such discrete-type liquid crystal lens for the geometric transformation lens, since the orientation state of the molecules in the liquid crystal can be changed freely according to the given voltages, the effect similar to that of the abovementioned embodiment can be achieved.

In the abovementioned embodiment, it is explained for the case that the totally 64 magnifying/demagnifying electrodes $EL_{2,mn}$ (m and n are integers from 1 to 8, respectively), aligned as an 8×8 matrix (8 in the longitudinal and 8 in the lateral), are provided as the magnifying/demagnifying electrode. The present invention is not limited to this example, but totally M×N magnifying/demagnifying electrodes $EL_{2,mn}$ (m is an integer from 1 to M and n is an integer from 1 to N where M and N are arbitrary integers), aligned as an M×N matrix (M in the longitudinal and N in the lateral), i.e., any number of the magnifying/demagnifying electrodes $EL_{2,mn}$ is applicable.

In addition, the abovementioned embodiment is the case that the totally (8×8)×4 rotating electrodes $EL^{xy}_{1,mn}$ (x and y are integers 1 or 2 which correspond to a position of the 4 electrodes for rotating by 2×2 matrix), aligned regularly as a 2×2 matrix (2 in the longitudinal and 2 in the lateral) around each of the 8×8 magnifying/demagnifying electrodes $EL_{2,mn}$ (8 in the longitudinal and 8 in the lateral) are provided. The present invention is not limited to this example, but totally (M×N)×(X×Y) rotating electrodes $EL^{xy}_{1,mn}$ (x is an integer from 1 to X and y is an integer from 1 to Y, where X and Y are arbitrary integers in the longitudinal and in the lateral, respectively), aligned as an X×Y matrix around each of the M×N magnifying/demagnifying electrodes $EL_{2,mn}$ (m is an integer from 1 to M and n is an integer from 1 to N, where M and N are arbitrary integers in the longitudinal and in the lateral, respectively), i.e., any number of the rotating electrodes $EL^{xy}_{1,mn}$ is applicable.

In addition to the abovementioned continuous-type liquid crystal lens for the geometric transformation lens 20a, 20b, 20c, and 20d and the discrete-type liquid crystal lens for the geometric transformation lens mentioned as modified example of the embodiment, another liquid crystal lens for the geometric transformation lens having various configurations is applicable such as a continuous-discrete hybrid-type liquid crystal lens for the geometric transformation lens, in which the liquid crystal lens layer is divided discretely to a larger liquid crystal lens cell than the micro liquid crystal lens cell 41, and in which the liquid crystal lens layer has the ITO electrode layer having the continuous-type electrode pattern. Note that, with the liquid crystal lens for the geometric transformation lens 20a, 20b, 20c, and 20d having the continuous-type liquid crystal lens layer adopted in the abovementioned embodiment, the target image having larger amount of light can be projected on the solid-state imaging chip, the magnification and the rotation angle at each point of the projection image can be determined arbitrarily, and thereby changing its target projection image continuously and smoothly, compared to the discrete-type geometric transformation lens, because this configuration does not have the partition plates 40.

In addition, the abovementioned embodiment, it is explained for the case that the magnifying/demagnifying process and the rotation process can be carried out in the single liquid crystal lens for the geometric transformation lens 20a, 20b, 20c, and 20d in which the ITO electrode layer 31 having an arrangement of the given pattern by the magnifying/demagnifying electrodes $EL_{2,mn}$ and the rotating electrodes $EL^{xy}_{1,mn}$ is provided in the liquid crystal lens layer 23. The present invention is not limited to this example, but, as mentioned in the above, only the magnifying/demagnifying process in the single liquid crystal lens for the geometric transformation lens can be carried out by setting the ITO electrode layer aligning only with the magnifying/demagnifying electrodes $EL_{2,mn}$ in the given pattern as in FIG. 9A in the liquid crystal lens layer 23. At the same time, only the rotating process in the single liquid crystal lens for the geometric transformation lens can be carried out by setting the ITO electrode layer aligning only with the rotating electrodes $EL^{xy}_{1,mn}$ in the given pattern as in FIG. 9B in the liquid crystal lens layer 23.

Further, the inside lens part can be composed of a multi-layer structure of the liquid crystal lens for the geometric transformation lens which can carry out only the magnifying/demagnifying process and the liquid crystal lens for the geometric transformation lens which can carry out only the rotating process. In case that such structure is provided to allow the pan angle rotation of the molecules in the liquid crystal and the tilt angle rotation of the molecules in the liquid crystal to be controlled independently for each geometric transformation lens, advantageous effects can be attained from not only acquiring the target projection image by changing continuously its distribution of magnification and the amount of rotation, but also from achieving much larger amount of light by simplifying the electrode alignment in each liquid crystal lens layer.

Moreover, the abovementioned embodiment is the case that the liquid crystal lens for the geometric transformation lens 20a, 20b, 20c, and 20d magnifies/demagnifies and rotates the target projection image focused on the solid-state imaging chip based on changing the orientation state of the molecules 35 in the liquid crystal by applying the magnification instruction voltage $V_{2,mn}$, the demagnification instruction voltage $V'_{2,mn}$, and the rotation instruction voltage $V^{xy}_{1,mn}$. The present invention is not limited to this example. It is applicable that the geometric transformation lens by which the target projection image focused on the solid-state imaging chip can be transformed geometrically into various forms such as parallel translation based on changing the orientation state of the molecules 35 in the liquid crystal arbitrarily by the given voltage applied to the ITO electrode layer 31.

For example, the liquid crystal lens for the geometric transformation lens 20a in the input side lens set 18a is picked up as an example among the liquid crystal lenses for the geometric transform lens 20a, 20b, 20c, and 20d. In order to translate parallel the target projection image focused on the solid-state imaging chip by the geometric transformation lens 15, the magnification instruction voltage $V_{2,mn}$ (or the demagnification instruction voltage $V'_{2,mn}$) to be applied to the magnifying/demagnifying electrode $EL_{2,mn}$ placed at a given point makes equal with the 4 rotation instruction voltages $V^{xy}_{1,mn}$ around the magnifying/demagnifying electrode $EL_{2,mn}$ and apply this voltage $V_{2,mn}$ (or the $V'_{2,mn}$) as a translation instruction voltage. By the translation instruction voltage applied, the orientation state of the molecules 35 in the liquid crystal is changed to allow the lens 20a to perform as the liquid crystal lens for the geometric transformation lens to translate the target projection image focused on the solid-state imaging chip towards any one direction among up, down, right or left.

Specifically, in order to translate the target projection image in one direction, the target projection image can be translated parallel towards the same one direction as an arbitrary direction by moving the molecules 35 in the liquid crystal of the liquid crystal lens for the geometric transformation lens 20a and 20b simultaneously towards the arbitrary direction, where the orientation direction of the molecules 35 in the liquid crystal of the liquid crystal lens for the geometric transformation lens 20b is orthogonal to that of the liquid crystal lens for the geometric transformation lens 20a and the lens 20b is controlled in the same way as the abovementioned lens 20a.

Thus, in the abovementioned embodiment, the liquid crystal lens for the geometric transformation lens 20a, 20b, 20c, and 20d can translate the image parallel as well as magnifying/demagnifying and rotating by a bias voltage, which is from the standard voltage to the magnification instruction voltage $V_{2,mn}$ (or the demagnification instruction voltage $V'_{2,mn}$) and the surrounding 4 rotation instruction voltages $V^{xy}_{1,mn}$, applied to the standard electrode 30. In this case, some bias voltage applied to make the pre-tilt angle be 0 degree is regarded as the standard voltage. The bias voltage which is from the standard voltage corresponds to a value of parallel translation.

In the abovementioned embodiment, it is described as that the geometric transform lens, in which the refraction index in the liquid crystal lens for the geometric transformation lens 20a, 20b, 20c, and 20d is changed using the molecules 35 in the liquid crystal of which the orientation state is changed with the magnification instruction voltage $V_{2,mn}$, the demagnification instruction voltage $V'_{2,mn}$, and the rotation instruction voltage $V^{xy}_{1,mn}$, applied. However, the present invention is not limited to this example. For example, it is applicable in the geometric transform lens in which the refraction index is changed using various refraction index changing means changing the internal refraction index without deforming the external appearance and shape of parts of a target by given the external stimulus, e.g., magnetic, of atomic force, of molecular attraction, of radiation and so on.

As a way to change luminous refraction index, changing degree of transparency of the thin-film material can be applied. For instance, using laminated thin-film materials composed any one or any combination of indium tin oxide, tungsten oxide, tantalum oxide, aluminium, palladium, and magnesium-nickel alloy formed on a substrate made of glass, plastic and so on, the refraction index is changed based on changing degree of transparency of the thin-film material by electrical power or magnetic power externally applied.

In addition, although the abovementioned embodiment is described as that the geometric transformation lens uses the liquid crystal lens for the geometric transformation lens 20a, 20b, 20c, and 20d in which the luminous refraction index is changed by the molecules 35 in the liquid crystal, the present invention is not limited to this example. It is applicable in the geometric transformation lens to change refraction index of not only luminous but also all sorts of things to be refracted such as electronic, electric, magnetic, atomic, of molecular attraction, and of radiation.

The invention claimed is:

1. An imaging device comprising:
   an imaging part including a solid-state imaging chip; and
   a geometric transformation lens, the geometric transformation lens receiving luminous flux from a target and outputting an emission ray to the imaging part to form an image on the solid-state imaging chip, wherein
   the geometric transformation lens includes at least one liquid crystal lens for the geometric transformation lens, the liquid crystal lens for the geometric transformation lens comprising:
   a first electrode provided in a first substrate;
   a second electrode provided in a second substrate;
   a plurality of magnifying/demagnifying electrodes provided in a regularly-arranged manner on the first electrode; and
   a liquid crystal lens layer provided between the first substrate and the second substrate, in which molecules in a liquid crystal of the liquid crystal lens layer are arranged to face the magnifying/demagnifying electrodes and orientation of the molecules in the liquid crystal is controlled by a voltage applied to the magnifying/demagnifying electrodes, wherein
   the molecules in the liquid crystal comprise:
   molecules corresponding to a designated magnifying/demagnifying point, being oriented by magnification/demagnification instruction voltage applied to one or plural magnifying/demagnifying electrodes selected from the magnifying/demagnifying electrodes to change only desired one or plural regions in a target projection image into a refraction index distribution state serving as aspherical convex lens or aspherical concave lens and to allow the luminous flux from the target to magnify or demagnify; and other molecules apart from the designated magnifying/demagnifying point, maintaining a wide-angle field of view free from influence of the magnification/demagnification instruction voltage, and
   the liquid crystal lens layer outputs the target projection image to the solid-state imaging chip as the emission ray, in which the target projection image is the image having one or plural magnified/demagnified regions corresponding to the designated magnifying/demagnifying point while maintaining the wide-angle field of view at the original magnification as a whole by the other molecules in the liquid crystal, and
   the imaging part exposes the target projection image formed on the solid-state imaging chip to generate an image signal of the target projection image.

2. The imaging device according to claim 1, wherein the geometric transformation lens comprises a plurality of rotating electrodes provided in a regularly-arranged manner on the first electrode, and controls the orientation of the molecules in the liquid crystal facing the plurality of rotating electrodes due to a voltage applied to the plurality of rotating electrodes, to allow the target projection image to rotate based on refraction of luminous flux from the target via the molecules in the liquid crystal.

3. The imaging device according to claim 1, wherein the geometric transformation lens controls the orientation of the molecules in the liquid crystal provided between the first electrode and the second electrode due to a bias voltage applied to the first electrode from the second electrode, to allow the target projection image to translate parallel based on refraction of luminous flux from the target via the molecules in the liquid crystal.

4. The imaging device according to claim 1, further comprising an input image correction part receiving the image signal from the imaging part, wherein
the input image correction part generates an image signal reverted back to the original magnification based on the image signal received from the imaging part either by demagnifying a region magnified by the geometric transformation lens with the same magnification ratio as magnified or by magnifying a region demagnified by the geometric transformation lens with the same magnification ratio as demagnified.

5. The imaging device according to claim 1, wherein the geometric transformation lens includes two liquid crystal lenses for the geometric transformation lens laminated together to form a two-layer structure, in which an orientation direction of the molecules in the liquid crystal of the liquid crystal lens for the geometric transformation lens as a first layer is orthogonal to that of the molecules in the liquid crystal of the liquid crystal lens for the geometric transformation lens as a second layer.

6. The imaging device according to claim 1, wherein the geometric transformation lens includes an input-side lens set comprising two the liquid crystal lenses for the geometric transformation lens laminated together to form a two-layer structure and an output-side lens set comprising two liquid crystal lenses for the geometric transformation lens laminated together to form the two-layer structure.

* * * * *